(12) United States Patent
Labrosse et al.

(10) Patent No.: US 10,085,562 B1
(45) Date of Patent: Oct. 2, 2018

(54) ERGONOMIC SEATING SYSTEM, TILT-LOCK CONTROL AND REMOTE POWERING METHOD AND APPARTUS

(71) Applicant: STEELCASE INC., Grand Rapids, MI (US)

(72) Inventors: Jean-Paul Labrosse, Altadena, CA (US); Scott Sullivan, San Francisco, CA (US)

(73) Assignee: STEELCASE INC., Grand Rapids, MI (US)

( * ) Notice: Subject to any disclaimer, the term of this patent is extended or adjusted under 35 U.S.C. 154(b) by 0 days.

(21) Appl. No.: 15/689,849

(22) Filed: Aug. 29, 2017

Related U.S. Application Data

(60) Provisional application No. 62/409,041, filed on Oct. 17, 2016.

(51) Int. Cl.
*G08B 23/00* (2006.01)
*A47C 1/024* (2006.01)
(Continued)

(52) U.S. Cl.
CPC .......... *A47C 1/0242* (2013.01); *G05B 19/402* (2013.01); *G05B 19/406* (2013.01);
(Continued)

(58) Field of Classification Search
CPC ....... A61B 5/1116; A47C 1/024; A47C 7/004; A47C 7/006; A47C 7/425; A47C 7/72;
(Continued)

(56) References Cited

U.S. PATENT DOCUMENTS

| 3,953,770 A | 4/1976 | Hayashi |
| 4,163,929 A | 8/1979 | Janu et al. |
| (Continued) | | |

FOREIGN PATENT DOCUMENTS

| CN | 202286910 U | 7/2012 |
| DE | 19604329 A1 | 8/1997 |
| (Continued) | | |

OTHER PUBLICATIONS

Anthro Corporation, Can Anthro "Walk the Talk"?: Employees Embark on a 30-Day Sit-Stand Challenge, Press Release Oct. 11, 2010, www.anthro.com/press-releases/2010/employees-embark-on-a-30-day-sit-stand-challenge, Copyright 2016, 4 pages.
(Continued)

*Primary Examiner* — Toan N Pham
(74) *Attorney, Agent, or Firm* — Quarles & Brady LLP

(57) ABSTRACT

A system for guiding a user while changing the juxtaposition of one furniture component with respect to another furniture component on a furniture assembly, the system comprising a sensor for sensing the position of the first component with respect to the second component, an indicator for indicating when the position of the first component with respect to the second component should be changed by the user from a current position to another position, a control mechanism activatable by the user for changing the position of the first component with respect to the second component and a processor programmed to use sensor signals to track the position of the first component and to provide periodic first reminders to change the position of the first component from the current position to another position, the processor continuing to track the first component position as a user moves the first component toward the another position and, when the repositioning stops short of the another position, controlling the indicator to generate a first alert.

21 Claims, 19 Drawing Sheets

(51) Int. Cl.
*G05B 19/402* (2006.01)
*G05B 19/406* (2006.01)
*A47C 3/30* (2006.01)
*A47C 7/54* (2006.01)
*A47B 9/20* (2006.01)
*A47C 7/00* (2006.01)
*A47C 7/46* (2006.01)
*A47C 31/00* (2006.01)
*A47C 7/72* (2006.01)
*A47C 7/74* (2006.01)

(52) U.S. Cl.
CPC .............. *A47B 9/20* (2013.01); *A47C 3/30* (2013.01); *A47C 7/004* (2013.01); *A47C 7/006* (2013.01); *A47C 7/467* (2013.01); *A47C 7/54* (2013.01); *A47C 7/725* (2013.01); *A47C 7/748* (2013.01); *A47C 31/008* (2013.01); *G05B 2219/45022* (2013.01)

(58) Field of Classification Search
CPC .... A47C 9/002; G08B 23/00; G08B 21/0415; G08B 21/0446; G08B 21/182
USPC ................................. 340/573.7, 573.1, 686.1
See application file for complete search history.

(56) References Cited

U.S. PATENT DOCUMENTS

| | | | |
|---|---|---|---|
| 4,440,096 A | 4/1984 | Rice et al. | |
| 4,571,682 A | 2/1986 | Silverman et al. | |
| 4,779,865 A | 10/1988 | Lieberman et al. | |
| 4,821,118 A | 4/1989 | Lavaliere | |
| 4,828,257 A | 5/1989 | Dyer et al. | |
| 4,849,733 A | 7/1989 | Conigliaro et al. | |
| 4,894,600 A | 1/1990 | Kearney | |
| 5,019,950 A | 5/1991 | Johnson | |
| 5,022,384 A | 6/1991 | Freels et al. | |
| 5,140,977 A | 8/1992 | Raffel | |
| 5,224,429 A | 7/1993 | Borgman et al. | |
| 5,259,326 A | 11/1993 | Borgman et al. | |
| 5,305,238 A | 4/1994 | Starr et al. | |
| 5,308,296 A | 5/1994 | Eckstein | |
| 5,323,695 A | 6/1994 | Borgman et al. | |
| 5,335,188 A | 8/1994 | Brisson | |
| 5,371,693 A | 12/1994 | Nakazoe | |
| 5,412,297 A | 5/1995 | Clark et al. | |
| 5,435,799 A | 7/1995 | Lundin | |
| 5,456,648 A | 10/1995 | Edinburg et al. | |
| 5,485,376 A | 1/1996 | Oike et al. | |
| 5,583,831 A | 12/1996 | Churchill et al. | |
| 5,612,869 A | 3/1997 | Letzt et al. | |
| 5,666,426 A | 9/1997 | Helms | |
| 5,765,910 A | 6/1998 | Larkin et al. | |
| 5,853,005 A | 12/1998 | Scanlon | |
| 5,870,647 A | 2/1999 | Nada et al. | |
| 5,890,997 A | 4/1999 | Roth | |
| 5,944,633 A | 8/1999 | Wittrock | |
| 6,013,008 A | 1/2000 | Fukushima | |
| 6,014,572 A | 1/2000 | Takahashi | |
| 6,030,351 A | 2/2000 | Schmidt et al. | |
| 6,032,108 A | 2/2000 | Sciple et al. | |
| 6,075,755 A | 6/2000 | Zarchan | |
| 6,135,951 A | 10/2000 | Richardson et al. | |
| 6,142,910 A | 11/2000 | Heuvelman | |
| 6,161,095 A | 12/2000 | Brown | |
| 6,286,441 B1 | 9/2001 | Burdi et al. | |
| 6,296,408 B1 | 10/2001 | Larkin et al. | |
| 6,312,363 B1 | 11/2001 | Watterson et al. | |
| 6,360,675 B1 | 3/2002 | Jones | |
| 6,447,424 B1 | 9/2002 | Ashby et al. | |
| 6,458,060 B1 | 10/2002 | Watterson et al. | |
| 6,527,674 B1 | 3/2003 | Clem | |
| 6,595,144 B1 | 7/2003 | Doyle | |
| 6,622,116 B2 | 9/2003 | Skinner et al. | |
| 6,669,286 B2 | 12/2003 | Iusim | |
| 6,702,719 B1 | 3/2004 | Brown et al. | |
| 6,716,139 B1 | 4/2004 | Hosseinzadeh-Dolkhani et al. | |
| 6,746,371 B1 | 6/2004 | Brown et al. | |
| 6,749,537 B1 | 6/2004 | Hickman | |
| 6,790,178 B1 | 9/2004 | Mault et al. | |
| 6,793,607 B2 | 9/2004 | Neil | |
| 6,964,370 B1 | 11/2005 | Hagale et al. | |
| 6,977,476 B2 | 12/2005 | Koch | |
| 6,987,221 B2 | 1/2006 | Platt | |
| 7,030,735 B2 | 4/2006 | Chen | |
| 7,063,644 B2 | 6/2006 | Albert et al. | |
| 7,070,539 B2 | 7/2006 | Brown et al. | |
| 7,128,693 B2 | 10/2006 | Brown et al. | |
| 7,141,026 B2 | 11/2006 | Aminian et al. | |
| 7,161,490 B2 | 1/2007 | Huiban | |
| 7,172,530 B1 | 2/2007 | Hercules | |
| 7,301,463 B1 | 11/2007 | Paterno | |
| 7,327,442 B1 | 2/2008 | Fear et al. | |
| 7,439,956 B1 | 10/2008 | Albouyeh et al. | |
| 7,510,508 B2 | 3/2009 | Santomassimo et al. | |
| 7,523,905 B2 | 4/2009 | Timm et al. | |
| 7,538,284 B2 | 5/2009 | Nielsen et al. | |
| 7,594,873 B2 | 9/2009 | Terao et al. | |
| 7,614,001 B2 | 11/2009 | Abbott et al. | |
| 7,628,737 B2 | 12/2009 | Kowallis et al. | |
| 7,635,324 B2 | 12/2009 | Balis | |
| 7,637,847 B1 | 12/2009 | Hickman | |
| 7,640,866 B1 | 1/2010 | Schermerhorn | |
| 7,652,230 B2 | 1/2010 | Baier | |
| 7,661,292 B2 | 2/2010 | Buitmann et al. | |
| 7,717,827 B2 | 5/2010 | Kurunmaki et al. | |
| 7,722,503 B1 | 5/2010 | Smith et al. | |
| 7,735,918 B2 | 6/2010 | Beck | |
| 7,857,731 B2 | 12/2010 | Hickman et al. | |
| 7,884,808 B2 | 2/2011 | Joo | |
| 7,892,148 B1 | 2/2011 | Stauffer et al. | |
| 7,909,737 B2 | 3/2011 | Ellis et al. | |
| 7,914,468 B2 | 3/2011 | Shalon et al. | |
| 7,931,563 B2 | 4/2011 | Shaw et al. | |
| 7,955,219 B2 | 6/2011 | Birrell et al. | |
| 8,001,472 B2 | 8/2011 | Gilley et al. | |
| 8,024,202 B2 | 9/2011 | Carroll et al. | |
| 8,047,914 B2 | 11/2011 | Morrow | |
| 8,047,966 B2 | 11/2011 | Dorogusker et al. | |
| 8,051,782 B2 | 11/2011 | Nethken et al. | |
| 8,052,580 B2 | 11/2011 | Saalasti et al. | |
| 8,092,346 B2 | 1/2012 | Shea | |
| 8,105,209 B2 | 1/2012 | Lannon et al. | |
| 8,109,858 B2 | 2/2012 | Redmann | |
| 8,159,335 B2 | 4/2012 | Cox, Jr. | |
| 8,167,776 B2 | 5/2012 | Lannon et al. | |
| 8,206,325 B1 | 6/2012 | Najafi et al. | |
| 8,257,228 B2 | 9/2012 | Quatrochi et al. | |
| 8,361,000 B2 | 1/2013 | Gaspard | |
| 8,381,603 B2 | 2/2013 | Peng et al. | |
| 8,432,356 B2 | 4/2013 | Chase | |
| 8,462,921 B2 | 6/2013 | Parker | |
| 8,477,039 B2 * | 7/2013 | Gleckler | A61B 5/103 181/273 |
| 8,522,695 B2 | 9/2013 | Ellegaard | |
| 8,540,641 B2 | 9/2013 | Kroll et al. | |
| 8,550,820 B2 | 10/2013 | Soltanoff | |
| 8,560,336 B2 | 10/2013 | Schwarzberg et al. | |
| 8,593,286 B2 | 11/2013 | Razoumov et al. | |
| 8,595,023 B2 | 11/2013 | Kirchhoff et al. | |
| 8,620,617 B2 | 12/2013 | Yuen et al. | |
| 8,668,045 B2 | 3/2014 | Cohen | |
| 8,688,467 B2 | 4/2014 | Harrison et al. | |
| 8,690,578 B1 | 4/2014 | Nusbaum et al. | |
| 8,690,735 B2 | 4/2014 | Watterson et al. | |
| 8,700,690 B2 | 4/2014 | Raghav et al. | |
| 8,771,222 B2 | 7/2014 | Kanderian, Jr. et al. | |
| 8,812,096 B2 | 8/2014 | Flaherty et al. | |
| 8,814,754 B2 | 8/2014 | Weast et al. | |
| 8,818,782 B2 | 8/2014 | Thukral et al. | |
| 8,821,350 B2 | 9/2014 | Maertz | |
| 8,825,482 B2 | 9/2014 | Hernandez-Abrego et al. | |
| 8,836,500 B2 | 9/2014 | Houvener et al. | |

(56) References Cited

U.S. PATENT DOCUMENTS

| | | |
|---|---|---|
| 8,847,988 B2 | 9/2014 | Geisner et al. |
| 8,947,215 B2 | 2/2015 | Mandel et al. |
| 8,965,541 B2 | 2/2015 | Martinez et al. |
| 8,984,685 B2 | 3/2015 | Robertson et al. |
| 8,997,588 B2 | 4/2015 | Taylor |
| 9,049,923 B1 | 6/2015 | Delagey et al. |
| 9,084,475 B2 | 7/2015 | Hjelm |
| 9,119,568 B2 | 9/2015 | Yin et al. |
| 9,167,894 B2 | 10/2015 | DesRoches et al. |
| 9,236,817 B2 | 1/2016 | Strothmann et al. |
| 9,486,070 B2 | 11/2016 | Labrosse et al. |
| 9,795,322 B1 * | 10/2017 | Karunaratne ......... A61B 5/1116 |
| 9,905,106 B2 * | 2/2018 | Yang ................ G08B 21/0415 |
| 9,907,396 B1 | 3/2018 | Labrosse et al. |
| 2001/0013307 A1 | 8/2001 | Stone |
| 2001/0028308 A1 | 10/2001 | De La Huerga |
| 2002/0055419 A1 | 5/2002 | Hinnebusch |
| 2002/0145512 A1 | 10/2002 | Sleichter, III et al. |
| 2004/0010328 A1 | 1/2004 | Carson et al. |
| 2004/0014014 A1 | 1/2004 | Hess |
| 2004/0229729 A1 | 11/2004 | Albert et al. |
| 2004/0239161 A1 | 12/2004 | Lee |
| 2005/0058970 A1 | 3/2005 | Perlman et al. |
| 2005/0113649 A1 | 5/2005 | Bergantino |
| 2005/0165626 A1 | 7/2005 | Karpf |
| 2005/0172311 A1 | 8/2005 | Hjelt et al. |
| 2005/0182653 A1 | 8/2005 | Urban et al. |
| 2005/0202934 A1 | 9/2005 | Olrik et al. |
| 2005/0209051 A1 | 9/2005 | Santomassimo et al. |
| 2006/0063980 A1 | 3/2006 | Hwang et al. |
| 2006/0205564 A1 | 9/2006 | Peterson |
| 2006/0241520 A1 | 10/2006 | Robertson |
| 2006/0250524 A1 | 11/2006 | Roche |
| 2006/0266791 A1 | 11/2006 | Koch et al. |
| 2007/0135264 A1 | 6/2007 | Rosenberg |
| 2007/0179355 A1 | 8/2007 | Rosen |
| 2007/0200396 A1 | 8/2007 | Baumann et al. |
| 2007/0219059 A1 | 9/2007 | Schwartz et al. |
| 2007/0265138 A1 | 11/2007 | Ashby |
| 2008/0030317 A1 | 2/2008 | Bryant |
| 2008/0045384 A1 | 2/2008 | Matsubara et al. |
| 2008/0051256 A1 | 2/2008 | Ashby et al. |
| 2008/0077620 A1 | 3/2008 | Gilley et al. |
| 2008/0098525 A1 | 5/2008 | Doleschal et al. |
| 2008/0132383 A1 | 6/2008 | Einav et al. |
| 2008/0245279 A1 | 10/2008 | Pan |
| 2008/0255794 A1 | 10/2008 | Levine |
| 2008/0256445 A1 | 10/2008 | Olch et al. |
| 2008/0300914 A1 | 12/2008 | Karkanias et al. |
| 2008/0304365 A1 | 12/2008 | Jarvis et al. |
| 2008/0306351 A1 | 12/2008 | Izumi |
| 2009/0076335 A1 | 3/2009 | Schwarzberg et al. |
| 2009/0078167 A1 | 3/2009 | Ellegaard |
| 2009/0132579 A1 | 5/2009 | Kwang |
| 2009/0156363 A1 | 6/2009 | Guidi et al. |
| 2009/0195393 A1 | 8/2009 | Tegeler |
| 2009/0229475 A1 | 9/2009 | Bally et al. |
| 2009/0270227 A1 | 10/2009 | Ashby et al. |
| 2009/0273441 A1 | 11/2009 | Mukherjee |
| 2010/0049008 A1 | 2/2010 | Doherty et al. |
| 2010/0073162 A1 | 3/2010 | Johnson et al. |
| 2010/0135502 A1 | 6/2010 | Keady et al. |
| 2010/0185398 A1 | 7/2010 | Berns et al. |
| 2010/0198374 A1 | 8/2010 | Carson et al. |
| 2010/0201201 A1 | 8/2010 | Mobarhan et al. |
| 2010/0205542 A1 | 8/2010 | Walman |
| 2010/0234184 A1 | 9/2010 | Le Page et al. |
| 2010/0323846 A1 | 12/2010 | Komatsu et al. |
| 2011/0015041 A1 | 1/2011 | Shea |
| 2011/0015495 A1 | 1/2011 | Dothie et al. |
| 2011/0033830 A1 | 2/2011 | Cherian |
| 2011/0054359 A1 | 3/2011 | Sazonov et al. |
| 2011/0080290 A1 | 4/2011 | Baxi et al. |
| 2011/0104649 A1 | 5/2011 | Young et al. |
| 2011/0120351 A1 | 5/2011 | Shoenfeld |
| 2011/0182438 A1 | 7/2011 | Koike et al. |
| 2011/0184748 A1 | 7/2011 | Fierro et al. |
| 2011/0245979 A1 | 10/2011 | Koch |
| 2011/0275939 A1 | 11/2011 | Walsh et al. |
| 2011/0281248 A1 | 11/2011 | Feenstra et al. |
| 2011/0281687 A1 | 11/2011 | Gilley et al. |
| 2011/0296306 A1 | 12/2011 | Oddsson et al. |
| 2012/0015779 A1 | 1/2012 | Powch et al. |
| 2012/0051579 A1 | 3/2012 | Cohen |
| 2012/0116550 A1 | 5/2012 | Hoffman et al. |
| 2012/0173319 A1 | 7/2012 | Ferrara |
| 2012/0316661 A1 | 12/2012 | Rahman et al. |
| 2013/0002533 A1 | 1/2013 | Burroughs et al. |
| 2013/0012788 A1 | 1/2013 | Horseman |
| 2013/0086841 A1 | 4/2013 | Luper et al. |
| 2013/0116092 A1 | 5/2013 | Martinez et al. |
| 2013/0144470 A1 | 6/2013 | Ricci |
| 2013/0199419 A1 | 8/2013 | Hjelm |
| 2013/0199420 A1 | 8/2013 | Hjelm |
| 2013/0207889 A1 | 8/2013 | Chang et al. |
| 2013/0218309 A1 | 8/2013 | Napolitano |
| 2013/0316316 A1 | 11/2013 | Flavell et al. |
| 2013/0331993 A1 | 12/2013 | Detsch et al. |
| 2014/0096706 A1 | 4/2014 | Labrosse et al. |
| 2014/0109802 A1 | 4/2014 | Dienes et al. |
| 2014/0137773 A1 | 5/2014 | Mandel et al. |
| 2014/0156645 A1 | 6/2014 | Brust et al. |
| 2014/0245932 A1 | 9/2014 | McKenzie, III et al. |
| 2014/0249853 A1 | 9/2014 | Proud et al. |
| 2014/0270254 A1 | 9/2014 | Oishi et al. |
| 2015/0064671 A1 | 3/2015 | Murville et al. |
| 2015/0071453 A1 | 3/2015 | Po et al. |
| 2015/0142381 A1 | 5/2015 | Fitzsimmons et al. |
| 2015/0302150 A1 | 10/2015 | Mazar et al. |
| 2016/0051042 A1 | 2/2016 | Koch |
| 2016/0309889 A1 | 10/2016 | Lin et al. |
| 2017/0052517 A1 | 2/2017 | Tsai et al. |
| 2017/0135636 A1 | 5/2017 | Park et al. |

FOREIGN PATENT DOCUMENTS

| | | |
|---|---|---|
| DE | 10260478 A1 | 7/2004 |
| DE | 102008044848 A1 | 3/2010 |
| DE | 202014005160 U1 | 7/2014 |
| EP | 1159989 A1 | 12/2001 |
| EP | 1470766 A1 | 10/2004 |
| GB | 2424084 A | 9/2006 |
| JP | H11178798 A | 7/1999 |
| JP | 2001289975 A | 10/2001 |
| JP | 2005267491 A | 9/2005 |
| SE | 516479 C2 | 1/2002 |
| WO | 0219603 A2 | 3/2002 |
| WO | 02062425 A1 | 8/2002 |
| WO | 2005032363 A1 | 4/2005 |
| WO | 2005074754 A1 | 8/2005 |
| WO | 2006042415 A1 | 4/2006 |
| WO | 2006042420 A1 | 4/2006 |
| WO | 2006065679 A2 | 6/2006 |
| WO | 2007099206 A1 | 9/2007 |
| WO | 2008008729 A2 | 1/2008 |
| WO | 2008050590 A1 | 2/2008 |
| WO | 2008101085 A2 | 8/2008 |
| WO | 2010019644 A2 | 2/2010 |
| WO | 2010023414 A1 | 3/2010 |
| WO | 2011133628 A1 | 10/2011 |
| WO | 2012061438 A2 | 5/2012 |
| WO | 2012108938 A1 | 8/2012 |
| WO | 2013033788 A1 | 3/2013 |

OTHER PUBLICATIONS

Benallal, et al., A Simple Algorithm for Object Location from a Single Image Without Camera Calibration, In International Conference on Computational Science and Its Applications, pp. 99-104. Springer Berlin Heidelberg, 2003.

Bendixen, et al., Pattern of Ventilation in Young Adults, Journal of Applied Physiology, 1964, 19(2):195-198.

(56) References Cited

OTHER PUBLICATIONS

BrianLaF, asp.net 4.0 TimePicker User Control, www.codeproject.com/articles/329011/asp-net-timepicker-user-control, Feb. 25, 2012, 5 pages.
Ejaz, Time Picker Ajax Extender Control, www.codeproject.com/articles/213311/time-picker-ajax-extender-control, Jun. 22, 2011, 8 pages.
Heddings, Stop Hitting Snooze: Change the Default Reminder Time for Outlook Appointments, www.howtogeek.com/howto/microsoft-office/stop-hitting-snooze-change-the-default-reminder-time-for-outlook-appointments, Apr. 25, 2008, 2 pages.
Hopkins Medicine, Vital Signs (Body Temperature, Pulse Rate, Respiration Rate, Blood Pressure). Source: Johns Hopkins Medicine Health Library, 2016, pp. 1-4.
Kriebel, How to Create a Two-Panel Column Chart in Tableau (And Save Lots of Time Compared to Excel), www.vizwiz.com/2012/02/how-to-create-two-panel-column-chart-in.html, 2012, 14 pages.
LINAK, Deskline Deskpower DB4/DL4 Systems User Manual, Copyright LINAK 2007.
LINAK, Deskline DL9/DB9/DL11 System User Manual, Copyright LINAK 2007.
LINAK, Deskline Controls/Handsets User Manual, Copyright LINAK 2017.
LINAK, DPG Desk Panels—A New Way to Adjust Your Office Desk, Product News, May 19, 2017.
Microsoft, Automatically Adjust the Start and Finish Dates for New Projects, Applies To: Project 2007, Project Standard 2007, https://support.office.com/en-us/article/Automatically-adjust-the-start-and-finish-dates-for-new-projects-27c57cd1-44f3-4ea8-941a-dc5d56bdc540?ui=en-US&rs=en-US&ad=US&fromAR=1, Copyright 2017 Microsoft.
mrexcel.com, Forum: How to Calculate Percentage of Total Used Time, www.mrexcel.com/forum/excel-qestions/192521-how-calculate-percentage-total-used-time.html., Post Date: Mar. 20, 2006, 4 pages.
Office Details, Inc., Height-AdjusTable Worksurfaces User Instructions, Copyright 2004 Office Details, Inc.
Paolo, Arduino Forum, Measuring Point to Point Distances With Accelerometer, http://forum.arduino.cc/index.php?action=printpage;topic=49902.0;images, Post Date: Jan. 26, 2011, 5 pages.
Process Dash, Using the Task & Schedule Tool, www.processdash.com/static/help/Topics/Planning/UsingTaskSchedule.html, Mar. 4, 2011.
Steelcase, Inc., Airtouch Height-Adjustable Tables, Brochure, Copyright 2015 Steelcase Inc.
Steelcase, Inc., Migration Height-Adjustable Desk, Brochure, Copyright 2015 Steelcase Inc.
Steelcase, Inc., Ology Height-Adjustable Desk, Brochure, Copyright 2016 Steelcase Inc.
Steelcase, Inc., Series 5 Sit-To-Stand Height-Adjustable Tables, Brochure, Copyright 2015 Steelcase Inc.
Steelcase, Inc., Series 7 Enhanced Sit-To-Stand Height-Adjustable Tables, Brochure, Copyright 2015 Steelcase Inc.
Sun Microsystems, Lights Out Management Module, https://docs.oracle.com/cd/E19585-01/819-0445-10/lights_out.html, Copyright 2004, Sun Microsystems, Inc.
Wideman, Issues Regarding Total Time and Stage 1 Time, http://maxwideman.com/papers/resource/issues.html, 1994.

* cited by examiner

ERGONOMIC SEATING SYSTEM, TILT-LOCK CONTROL AND REMOTE POWERING METHOD AND APPARTUS

CROSS-REFERENCE TO RELATED APPLICATIONS

This application is related to and claims priority to U.S. provisional patent application No. 62/409,041, filed on Oct. 17, 2016, which is entitled "Ergonomic Seat System" which is incorporated herein in its entirety by reference.

BACKGROUND OF THE DISCLOSURE

Field

The present disclosure relates generally to powered furniture. More particularly, the present disclosure relates to powered rolling chairs that include electrical components and systems for providing such onboard components with remote power.

Chair Movement:

A common misunderstanding is that sitting upright and straight in an office chair is the right way to sit at all times. To the contrary, many ergonomics experts have said "your best position is your next position" indicating that alternating between sitting upright and reclining slightly and other positions is ideal. This is because staying fixed in any one position can cause fatigue, lead to slouching, discomfort or other negative consequences. Sitting in an upright posture for a long period with the person's thigh to trunk angle at or near 90 degrees can cause a person's pelvis to rotate backwards, which in turn, flattens the normal lumbar curve of the user's spine. Changing the curvature of the spine in this manner has been found to significantly increase the lumbar disc pressure by as much as 40% compared to the disc pressure when standing. This increase in disc pressure can cause fatigue and lower back pain, and even pinched nerves.

Lower back pain continues to be among the most common complaints for adults, and is one of the most common reasons given for doctor visits:

According to a University of Missouri—Columbia School of Health Professions report, there is an 80% lifetime prevalence of low back pain for adults. At any given time, 20-30% of people will have back pain, and back pain is usually recurrent and often progressive.

A spinehealth.com poll showed that 70% of all respondents report increased lower back pain after sitting at work (15% report no change and 15% report improved back pain—i.e., less).

There are important benefits to change position while seated. The simple act of moving allows the user's muscles to effectively help pump blood throughout the user's body. Also, movement of the user's spine (for instance when reclining) can nourish and support health of discs of the user's vertebrae, and body movement of a user's joints is generally positive for joints and ligaments. All of this can support comfort and a reduction in the likelihood or incidence of back pain.

In order to support users in changing positions regularly while seated, many current ergonomic chairs are designed with several different adjustments. However, once a chair is initially adjusted to fit a user, many users forget, or simply do not make use of the adjustment features for the purposes of changing the position during the day, due to lack of knowledge on how to make the adjustments, a lack of understanding of the benefits or due to being preoccupied with other priorities.

Interestingly, often seated people seek to achieve different posture variations without adjusting the chair which can also have negative consequences because the chair is not properly supporting their body as designed. A typical seated user may try to position him or herself to any of the following three distinct modes of sitting while performing work at a desk:

Forward sitting: leaning slightly forward in the chair, often used for performing work on the plane of a desk or for interacting with office equipment;

Sitting upright: with the back supported by the back of the chair, which is a general purpose position accommodating most tasks Slightly reclined sitting: used for instance in conversation, telephoning, keyboarding, and mousing. Surveys indicate that it is a preferred work posture for many people; and Deeply reclined sitting: often used for resting, reading, and, in some cases, keyboarding.

Many ergonomic chairs require activation of levers and buttons to change most aspects of a seated position. Even reclining typically requires activation of a lever to release the recline-lock so that a user has solid back support when seated upright. The need for knowledge of how to adjust the chair and the requirement of the user's active management of the process all reduce the likelihood of a changes being made frequently.

U.S. Pat. No. 5,556,163 of Rogers, III, et al. discloses a chair that employs several actuators for selectively moving several different components, such as height, and recline, etc. The main intent of the powered drivers is to provide ease for the user to quickly make fine adjustment to his or her chair. This reference does further mention that the actuators may be automatically driven either randomly or following a schedule to make minor movements to each component to avoid user fatigue.

Although the chair disclosed by U.S. Pat. No. 5,556,163 does introduce automatically moving the different components of a chair to avoid fatigue, the movements are only meant to be minor and such movements would not be sufficient to prevent back strain that stems from elevated pressure on the user's spine nor correct a flattened lumbar curve.

U.S. Pat. No. 7,896,436 of Kurrasch et al. discloses a chair that includes powered actuators and sensors to automatically sense the weight of a user and to use this information to adjust the chair components for the best fit. This chair also includes provisions for recognizing different users and automatically adjusting the different settings based on the identity of a seated user.

Although the chair of Kurrasch et al. does utilize powered actuators to move various chair components, it moves the components based on the user's weight for comfort and correct fit and does not automatically move the components for the purpose of alleviating spinal pressure and correcting a flattened lumbar curve to mitigate back strain and associated pain.

Reclining Seating Movement:

Generally, conventional adjustable seating includes a seat and a pivotally attached backrest which can be reclined, as desired. The recline feature is usually spring-biased up to a hard stop so that when selected, the user may lean back against the backrest and gently recline, continuously supported by the spring-bias, up to the hard stop. How far back the backrest reclines (i.e., the angular location of the hard stop) is usually adjustable from a vertical position (or approximately vertical), where the user does not want the backrest to recline at all and prefers to have full support when he or she leans back (sitting up straight). At which recline angle the hard stop occurs is sometimes adjustable by the user, to different degrees of recline (usually maxing out at around 40 degrees from the vertical).

A problem with the recline feature is that many people don't end up using it. They want to be able to lean back and remain solidly upright. To this end, applicants have found that many users prefer to just lock off the recline feature, leaving the backrest effectively fixed in the full upright position. This is problematic because many ergonomics experts have said that one's "best position is his/her next position" indicating that alternating between sitting upright and reclining slightly and other positions is ideal. This is because staying fixed in any one position can cause fatigue, lead to slouching, discomfort or other negative consequences. Sitting in an upright posture for a long period with the person's thigh to trunk angle at or near 90 degrees can cause a person's pelvis to rotate backwards, which in turn, flattens the normal lumbar curve of the user's spine. Changing the curvature of the spine in this manner has been indicated to significantly increase the lumbar disc pressure by as much as 40% compared to the disc pressure when standing. This increase in disc pressure can cause fatigue and lower back pain, and even pinched nerves.

Lower back pain continues to be among the most common complaints for adults, and is one of the most common reasons given for doctor visits:

According to a University of Missouri—Columbia School of Health Professions report, there is an 80% lifetime prevalence of low back pain for adults. At any given time, 20-30% of people will have back pain, and back pain is usually recurrent and often progressive.

A spinehealth.com poll showed that 70% of all respondents report increased lower back pain after sitting at work (15% report no change and 15<}{, report improved back pain—i.e., less).

There are important benefits to changing position while seated. The simple act of moving can allow the user's muscles to effectively help pump blood throughout the user's body. Also, movement of the user's spine (for instance when reclining) can nourish and support health of discs of the user's vertebrae, and body movement of a user's joints is generally positive for joints and ligaments. All of this can support comfort and a reduction in the likelihood or incidence of back pain.

In order to support users in changing positions regularly while seated, many current ergonomic seating structures of the type used in an office environment are designed with several different adjustments and features. However, once a seating structure is initially adjusted, many users forget, or simply do not make use of the adjustment features for the purposes of changing the position during the day, due to lack of knowledge on how to make the adjustments, a lack of understanding of the benefits or due to being preoccupied with other priorities.

Removable Feature-Module:

Conventional adjustable seating structures usually include many features and are quite expensive. Some of these seating structures may be somewhat customizable, allowing the customer certain choices when ordering, such as fabric type and color, adjustable hand rests, adjustable recline. The Aeron® chair by Herman Miller of Zeeland, Mich. includes a lumbar support insert which is designed to provide two levels of firmness and support, depending on the orientation it is secured to the rear of the backrest.

Applicants have recognized a need to easily provide additional features to an adjustable seating structure, even as an after-market item.

Sit-Stand Desk with Remote Height Management:

Sit stand desks are getting more and more popular. Large companies are recognizing the health benefits and associated health-related cost savings in encouraging their employees to follow healthy lifestyles, including the use of sit/stand desks while at work.

Although it has been proven that use of such sit/stand desks are beneficial to one's health, it is not uncommon for the average user to use the standing feature of these height-adjustable desks less over time. In some cases, the user never uses the standing feature. This can be attributed to various reasons including that some users never knew the desk could move up and down and just use it as a sit-only desk and that some users are not being reminded to stand, forget to stand, or just do not break the habit of sitting. Most sit/stand desks are considered "non-intelligent" in that they are just mechanical structures that include a worktop that can be raised or lowered as desired by its user. In such desks, there is no intelligent system tracking when and for how long the worktop is positioned at a sitting height or a standing height and therefore health status and benefits cannot be meaningfully tracked. Some new versions of sit/stand desks are classified as "smart" desks because they do keep track of exact height usage, facilitate, motivate and remind users to change positions and some even make the height changes automatically to follow a health-schedule customized for each user. One such desk is sold by a company called Stirworks, located in Pasadena, Calif. 91103. However, even with smart sit/stand desks, some users do not respond to the software effectively losing the associated health benefits, or respond less frequently over time.

System for Charging Seat Structures:

There has been a strong effort in the furniture industry to provide electrically powered accessories to rolling-type office chairs. Lights, buzzers, vibration, heaters, etc. have been suggested and in some cases, developed to a commercial product. A common problem shared by all of these developments is how to provide power to a mobile chair.

SUMMARY OF THE DISCLOSURE

It is therefore a primary object of the present disclosure to overcome the deficiencies of the prior art.

It is another object of the disclosure to provide a chair that allows the user to quickly and easily reposition.

It is another object of the disclosure to provide a chair that reminds the user to reposition while seated in the chair.

It is another object of the disclosure to provide a powered chair that automatically repositions components of the chair to alleviate spinal pressure and correct a flattened lumbar curve at prescribed times to mitigate back strain and associated pain.

Some aspects of the present disclosure also relate generally to powered furniture. More particularly, the present disclosure relates to powered adjustable seating that includes moveable components.

It is therefore a primary object of the present disclosure to overcome the deficiencies of the prior art.

It is another object of the disclosure to provide a seating structure that allows the user to quickly and easily reposition.

It is another object of the disclosure to provide a seating structure that reminds the user to reposition while seated in the seating structure.

It is another object of the disclosure to provide a powered seating structure that automatically repositions components of the seating structure to alleviate spinal pressure and correct a flattened lumbar curve at prescribed times to mitigate back strain and associated pain.

It is therefore a primary object of the present disclosure to overcome the deficiencies of the prior art.

Some aspects of the present disclosure further relate generally to improvements to powered furniture. More particularly, the present disclosure relates to powered adjustable seating and powered height-adjustable sit-stand desks.

It is therefore a first object of this disclosure to overcome the deficiencies of the prior art.

It is a second object of the disclosure to provide a means to help encourage continued use of a sit/stand desk.

1) Batteries:

Batteries can, in most cases, be used to power such features of a chair, but of course these batteries eventually need to be replaced or recharged. Regularly changing batteries would usually be considered impractical and a burden, especially in a large company with many desks and chairs. Such regular maintenance requirements would likely result in the powered features to be eventually ignored and unused.

Alternatively, a chair requiring power could be tethered with a power cord to continuously provide the required power, but such a cord would likely become entangled and damaged during normal use of the chair, or look unsightly. Similar to changing batteries, plugging in a power cord each night would usually be considered a burden and impractical.

2) Generators and Solar Panels:

Another method to bring power to a mobile powered chair is to use the movement of the chair itself to generate power. U.S. Pat. No. 8,016,351 discloses such as system wherein electric generators are mechanically connected to at least one of the several caster wheels.

In use, as the user moves the chair on the floor, the rotating casters will in turn rotate the generators, which will generate power to charge onboard batteries. Unfortunately, a typical user seated in a chair does not roll the chair around enough during normal use to generate sufficient power to be effective or practical. Also, reverse EMF created in a generator generating power would create noticeable breaking torque making it very difficult and awkward for the user to move the chair around. The U.S. Pat. No. 8,016,351 patent also suggests using a solar panel on the back of the chair to help charge onboard batteries. This may help provide some or all required power for the chair, but such panels are expensive, fragile and require strong direct or ambient light to work effectively and generally are less efficient in environments that use low-power fluorescent lighting or indirect lighting (reflected light).

US Patent Publication No. 2013/0106155 discloses a chair having a seating structure that is supported by a central vertically disposed piston. The seating structure is designed to vertically displace in response to a seated person's weight, leveraging the up and down linear movement to generate electricity. It is also known to convert other chair-movements by a seated user into electricity, such as the reclining movement. This generated power is then used to power onboard electronics and/or batteries. Such methods often do not deliver enough power to consistently power desired functions.

3) Wireless Charging:

Power can also be transmitted wirelessly. Wireless technologies are those in which energy is transferred between components without wired connections such as sockets and plugs.

These wireless technologies generally include radio frequency (RF) transfer, induction, conduction and acoustic energy transmission technology. Exemplary wireless energy sources are disclosed in U.S. Pat. Publ. Nos. 2007/0182367, 2009/0072782, 2008/0246215, 2007/0194526, and 2004/0195767, which are incorporated herein by reference. In RF transfer technology, a source circuit generates an RF signal which is received by a second circuit. Energy is absorbed from the signal by the second circuit. RF energy can be transferred over a distance of several feet although the RF signal degrades rapidly as the distance from the source increases. Acoustic energy is similar to RF energy in that energy propagates multi-directionally.

In induction technology, a source, or primary, coil generates a magnetic field which induces current in a second, or secondary, coil. The area in which inductive energy may be received, referred to as a "hot-spot," is fairly localized adjacent the primary coil. Typically, in the embodiments disclosed herein, the primary coil will be integrated into an article of furniture, such as a desk, or a floor mat. A wireless device including the secondary coil may receive power from the primary coil by induction of electrical current in the secondary coil when the secondary coil is brought into proximity with the primary coil. The current generated in the secondary coil may be used to power the electronic device, or charge batteries in the electronic device. A controller produces a signal to power the primary coil at a modulated frequency. Information may be transferred by the signal to the secondary coil and then extracted by the electronic device being charged. The electronic device may include passive circuits and/or wireless communication circuits to transmit information back to the controller, thus establishing a "hand-shake" connection, which the controller may use to modulate the signal.

The use of induction technology is indeed promising, but a common problem with this otherwise elegant system is that the secondary coil must be accurately aligned over the primary coil for the system to be effective and the two coils must be positioned immediately adjacent to each other for effective power transmission to occur. This would require the office worker to carefully roll their office chair to a specific spot on their chair-mat each night before leaving so that the two coils align. It is not likely that a typical office worker would perform this task each day with any confidence or accuracy, especially when they are tired and must hurry to catch their train home. If the chair is not regularly charged, the onboard batteries will quickly lose their charge and the electrically powered features of the chair will cease to operate. If this happens, the user will quickly become frustrated and would likely lose interest in using the otherwise beneficial features of the chair.

4) Conductive Systems:

In conduction technology, an electrically conductive contact pad is mounted at a stationary location and another is secured to the mobile chair. The two contact pads are arranged so that they can be selectively aligned during a charging event. In such instance, the two contact pads are positioned so that they make contact and so that power can be transferred across the connection. The contact pads are typically flat elongate rectangular-shaped plates positioned in parallel. The polarity of each pad may be selected by controlling circuitry based in part on feedback from the contacts. Such controlling circuitry typically includes voltage and current regulators and features designed to protect the electronic devices and the controllers.

It is therefore a primary object of the present disclosure to overcome the deficiencies of the prior art.

It is another object of the disclosure to provide a system that effectively and efficiently provides power to a rolling-type chair without compromising the free-movement and function of the chair.

The features of this disclosure, and the manner of attaining them, will become more apparent and the disclosure itself will be better understood by reference to the following description of the disclosed embodiments taken in conjunction with the accompanying drawings.

BRIEF DESCRIPTION OF THE SEVERAL VIEWS OF THE DRAWINGS

The invention can be more fully understood from the following detailed description taken in conjunction with the accompanying drawings, in which.

DETAILED DESCRIPTION OF THE DISCLOSURE

Figure 1:
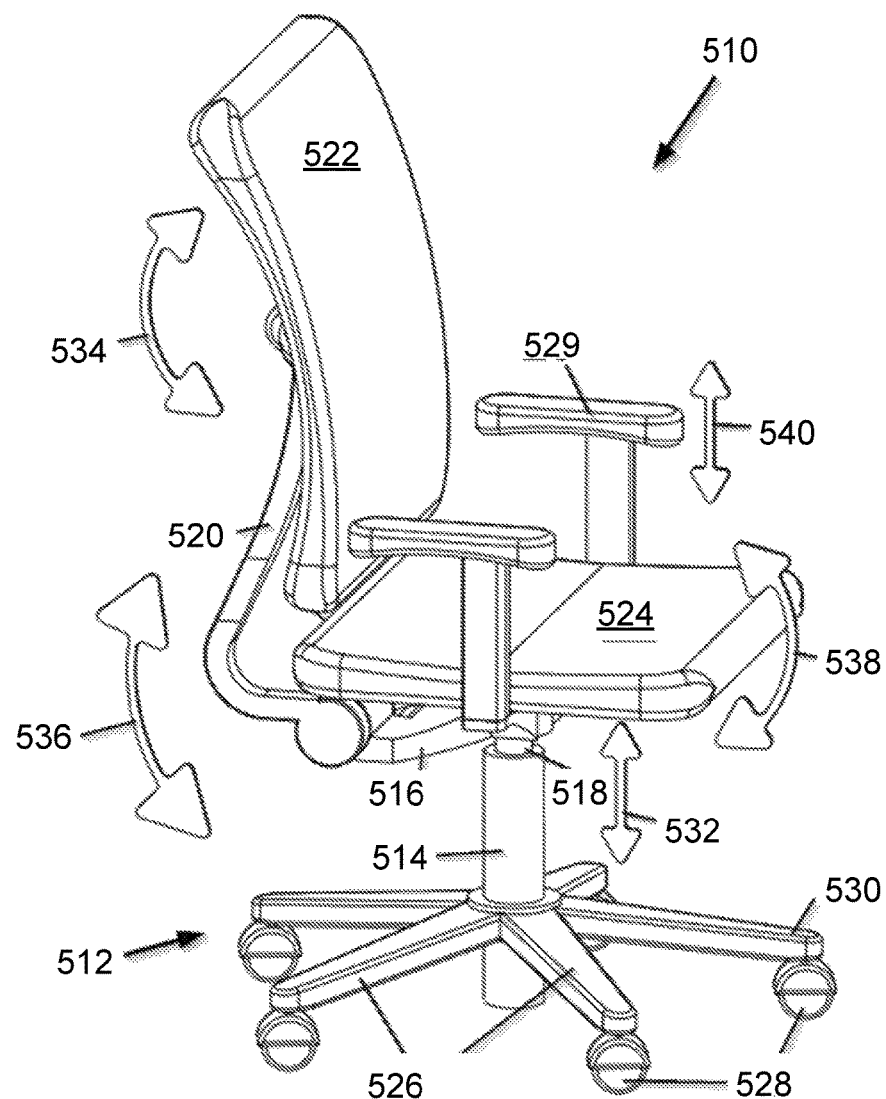
FIG. 1 is a front perspective view of an exemplary ergonomic chair, showing various components and movement arrows, in accordance with the present disclosure.

The various aspects of the subject disclosure are now described with reference to the drawings, wherein like reference numerals correspond to similar elements throughout the several views. It should be understood, however, that the drawings and detailed description hereafter relating thereto are not intended to limit the claimed subject matter to the particular form disclosed. Rather, the intention is to cover all modifications, equivalents, and alternatives falling within the spirit and scope of the claimed subject matter.

In the following detailed description, reference is made to the accompanying drawings which form a part hereof, and in which is shown by way of illustration, specific embodiments in which the disclosure may be practiced. These embodiments are described in sufficient detail to enable those of ordinary skill in the art to practice the disclosure. It should be understood, however, that the detailed description and the specific examples, while indicating examples of embodiments of the disclosure, are given by way of illustration only and not by way of limitation. From this disclosure, various substitutions, modifications, additions rearrangements, or combinations thereof within the scope of the disclosure may be made and will become apparent to those of ordinary skill in the art.

In accordance with common practice, the various features illustrated in the drawings may not be drawn to scale. The illustrations presented herein are not meant to be actual views of any particular method, device, or system, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or method. In addition, like reference numerals may be used to denote like features throughout the specification and figures.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description.

It will be understood by a person of ordinary skill in the art that the signal may represent a bus of signals, wherein the bus may have a variety of bit widths and the disclosure may be implemented on any number of data signals including a single data signal.

The various illustrative logical blocks, modules, circuits, and algorithm acts described in connection with embodiments disclosed herein may be implemented as electronic hardware, computer software, or combinations of both. To clearly illustrate this interchangeability of hardware and software, various illustrative components, blocks, modules, circuits, and acts are described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments of the disclosure described herein.

In addition, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on a computer-readable medium. Computer-readable media includes both computer storage media and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers or processors.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Chair Movement:

By way of overview, applicants have realized that it is desirable for an office chair to allow its user freedom of movement with little to no effort, while providing the user required support for health and, of course sufficient comfort to encourage continued use. There are several embodiments to this disclosure that improve upon the prior art and offer unique features to the rolling-type office chair.

The embodiments detailed below are preferably directed to ergonomic type chairs, typically used in offices and usually including wheels. Applicants have determined from research that a seated user should move regularly while seated to encourage a healthy disposition. As part of these regular movements, the user should:

a) Reduce lumbar strain by reclining in the chair;
b) Sitting upright with lowered thighs (provided by tilting the front edge of the seat down);
c) Sitting upright with raised thighs; and
d) Standing at their desk.

The user should ideally cycle through the above positions every 20 to 30 minutes to assist in preventing lower back pain and encourage a healthier disposition. When the user reclines, the spine is allowed to more easily return to a more normal curvature. This reduces or removes pressure on the discs of the user's vertebrae, which greatly reduces the chance of lower back pain. Of course, the user may not be able to as effectively work while fully reclined so other positions are necessary. Sitting upright with lowered thighs also increases the thigh-to-torso angle, which again helps the spine more easily attain a more normal curvature, which like reclining reduces disc pressure, but not as much as when fully reclined. Sitting upright with raised thighs may provide the most upright support for the user to work at a desk, but this position should not be used exclusively due to higher strain on discs. Finally, standing at regular and controlled intervals improves one's health.

Referring to FIG. 1, and according to a first embodiment of the present disclosure, a chair 510 is provided having a dolly structure 512, from which a post 514 upwardly extends. A yoke assembly 516 includes a vertically disposed piston 518 which is slidably secured to post 514, as understood by those of skill in the art. A back support assembly 520 is pivotally secured to a portion of yoke assembly 516. A back cushion 522 is pivotally secured to a portion of back support assembly 520. A seat cushion 524 is pivotally secured to a portion of yoke assembly 516. As is well known by those skilled in the art, dolly structure 512 includes 5 radially disposed legs 526, each having a caster wheel 528 pivotally attached to a remote end 530. A left and right side armrest 529 are mounted to yoke assembly 516 by a telescoping connection and are selectively vertically displaceable.

According to the disclosure, post 514 is slidably vertically displaceable (as shown by arrow 532 in FIG. 1) between a predetermined low position and a predetermined high position and is used as in conventional ergonomic chairs to raise and lower seat cushion 524 and all other connected parts, as desired by the user. According to the disclosure, post 514 is selectively movable to any point between low and high position using an electrically powered drive, such as an appropriate high-torque motor (not shown) or a magnetic linear drive, a digital high-torque stepper motor, and any required gearing or torque multiplier, as required to provide sufficient force to raise and lower the expected load safely and efficiently.

Figure 2:
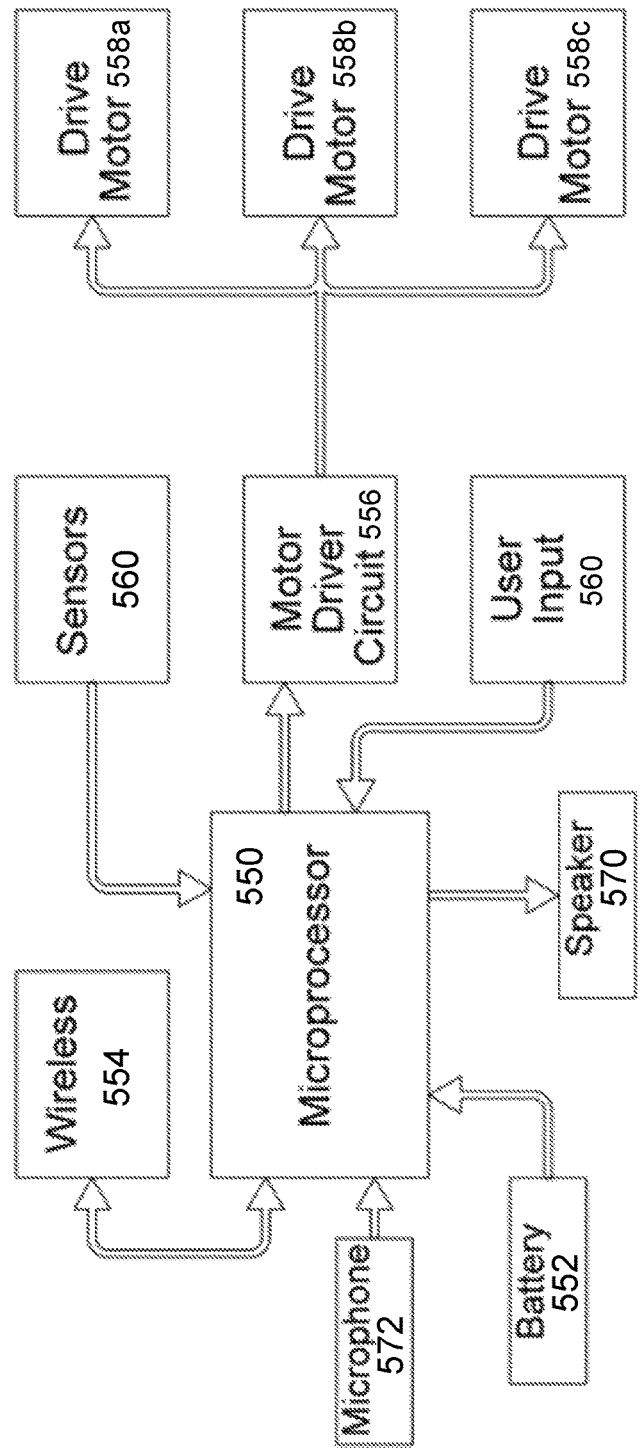
FIG. 2 is an operational schematic of the control system of the chair of FIG. 1, in accordance with the present disclosure.
Figure 3:
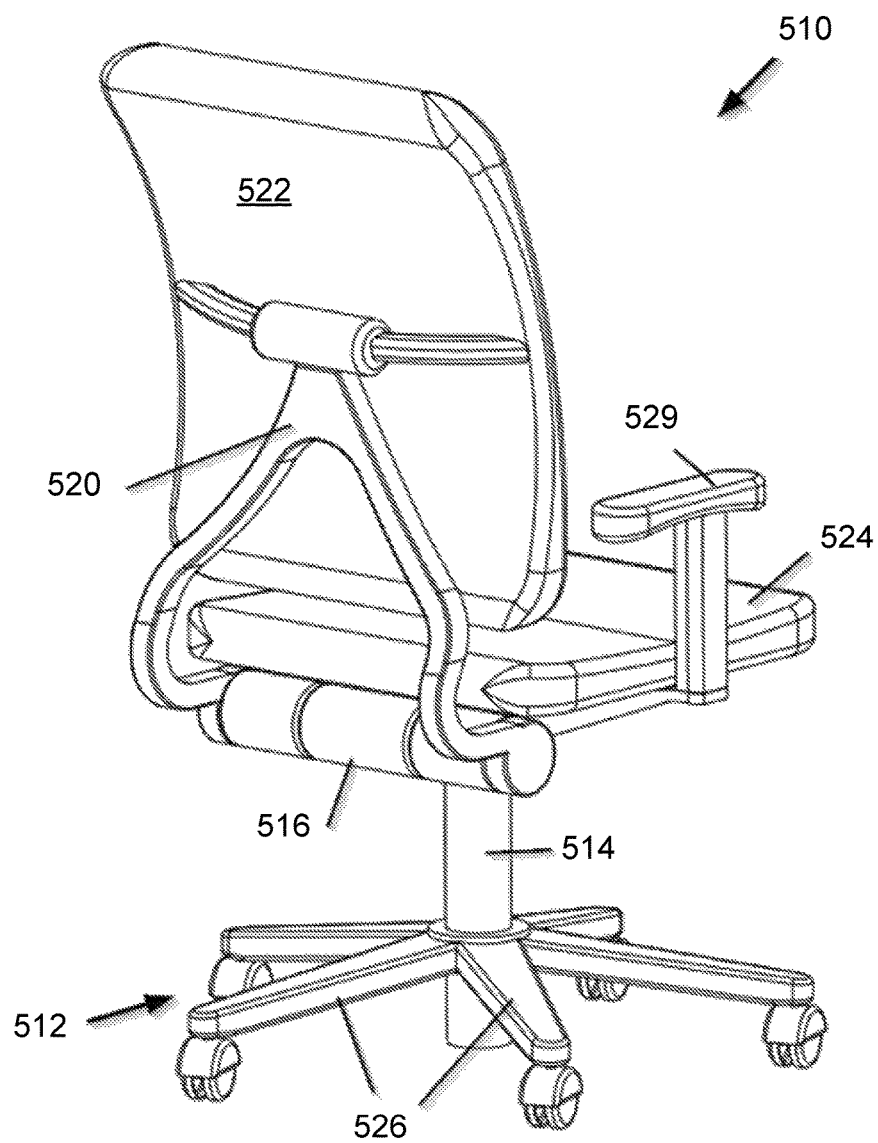
FIG. 3 is a rear perspective view of the exemplary ergonomic chair, showing various components and movement arrows, in accordance with the present disclosure.

An important aspect of this disclosure is that electrically powered motor drives, not shown in FIG. 1, but referred to in FIG. 2 as "558a, 558b, 558c, such as high-torque motors, servo motors with optical encoder feedback, electromagnetic linear drives, screw jack actuators or rotary actuators with hall sensor position feedback, a digital high-torque stepper motor or other such devices are used to selectively power all linear, tilting, and pivotal movements used throughout chair 510, including pivotal movement of back support assembly 520, indicated in FIG. 1 by arrow 534, pivotal movement of back cushion 522, indicated by arrow 536 in FIG. 1, tilting of lower seat cushion 524, indicated in FIG. 1 by arrow 538, lumbar support movement of back cushion 522, not shown by an arrow, and vertical displacement of either left or right side armrest 529, indicated by a single arrow 540, in FIG. 1.

Referring to FIG. 2, a schematic shows controller components used in accordance with the present disclosure, including a microprocessor 550, a battery 552, wireless communication 554, a motor driver circuit 556, drive motors 558a, 558b, 558c sensors 560 and user input 562. Microprocessor 550 is electrically connected to wireless communication 554, motor drive circuit 556, sensors 560 and user input 562. Battery 552 is shown connected to microprocessor 550 in FIG. 2 to provide power to that component, but it should be understood that battery 552 is effectively electrically connected to and powers all components, as necessary, and as understood by those skilled in the art.

Wireless communication 554 may be any type, such as Wi-Fi_____33, or Bluetooth® and is used to communicate information between chair 510 and a remote location. According to one aspect of this embodiment of the disclosure, chair position type and duration information (called "use-information") over a period of time can be collected, stored in onboard memory (not shown) and transmitted (following a schedule) to a remote location for review and storage. This use information will help determine how well the user is using his or her chair, establishing a "use-history profile." This information could be used, for example to ensure that the user is following a position-variation schedule with the highest health benefits and comfort. If not, a particular user could be sent encouragements, reminders, and instructions regarding how to properly set up and operate their chair. Wireless communication 554 can also be used to connect (or pair) to other smart devices, such as a smart phone, or an adjacent sit/stand desk, such as the one sold by a company called Stirworks Inc, located in Pasadena, Calif. 915103. In doing so, the sit/stand desk controller could merge the sit-position variation schedule with the sit/stand desk position schedule. Currently, sit/stand desks, if they are "smart," do not know what the user is doing once they are in the sit mode. By linking the control system of the chair, according to this disclosure, to the control system of a smart desk, such as the Stir Kinetic Desk, a much larger picture of the posture and health habits of each user at a workplace may be realized and used to benefit both the user and the company. Applicants' herein incorporate by reference patent application, publication number: US20140096706 A1, published Apr. 10, 2014 with a priority filing of Oct. 10, 2010, entitled: "Height-Adjustable Support Surface and System for Encouraging Human Movement and Promoting Wellness" discloses such a smart sit/stand desk. The content of this publication is incorporated by reference in its entirety as if the entire patent publication content were reprinted in this current application.

As explained in greater detail below, microprocessor 550 controls motor driver circuit 556, which in turn controls the operation of any of several motors 558a, b, c, as required by either a preset position variation schedule, stored in on-board memory (not shown), or as instructed by user input controls 562 (buttons pressed by a user) —manual control mode.

According to this embodiment of the disclosure, sensors 560 are used to communicate accurate motor drive positional information to microprocessor 550. For example, should a drive motor 558a, b, c be activated to vertically displace armrests 529 from a first height to a desired second height, sensors 560 would "read" exact position information and would send a signal to microprocessor 550 when motor drive 558a, b, c reaches the desired height, in this example. Of course, a variety of different types of sensors could be used to provide such accurate positional information, a preferred type would be the use of actuator/motors with Hall Effect sensor, whose operation is well known by those skilled in the art and therefore not explained in any great detail here. Briefly, as the motor rotates, magnets mounted asymmetrically pass by a sensor and the incremental change in magnetic field is detected and occurrences counted. This information is then used to very accurately control the displacement of any component (such as an armrest 529) attached to the drive mechanism. Also, sensor 560 could include a safety shutoff that indicates that the mechanical movement has physically reached the end of its travel and any further movement could cause damage. Sensor 560 could also include switches and sensors that detect user presence on the chair and its components, such as a strategically positioned pressure switches could be used to detect not only that a user is simply sitting on seat cushion 524, but how the person is actually sitting. For example, sensor information could learn that the user is seated on seat cushion 524 and leaning forward since a sensor located in the front of the seat is reading a high-than normal pressure reading and that the back cushion 522 is not reading any pressure. The microprocessor 550 could compare the incoming sensor readings with known (and stored in memory, not shown) pressure ranges to determine how a particular "sensor signature" conveys a particular seated position. Alternatively, microprocessor 550 could learn "normal" positional information by reading sensor information as the user is instructed to sit in chair 510 as microprocessor 550 instructs motors 558 to cause the different displaceable components of chair 510 to change positions, which in turn would cause the seated user to follow the different seated positions (lean forward without touching the backrest, sit back and upright, sit back with a slight recline, then more recline until full recline is reached, and then stand up from the chair without using the armrests for support and then stand up using the armrests for support. During this initial set up procedure, sensors 560 would be carefully measuring pressure and microprocessor 550 would be recording the incoming pressure information at the different pressure sensors throughout the chair for each chair component position, as conveyed by the different motors.

According to another feature of the present disclosure, as shown in FIG. 2, microphone 572 and speaker 570 are electrically connected to microprocessor 550 in a manner that is well known by those skilled in the art. Microphone 572 can be used to pick up audible commands by the user or to pick up useful sounds in the environment, such as an audible control sound that allows chair 510 to be controlled remotely, using sounds at set frequencies. For example, microphone 572 could "hear" and discern the unique sound of a person typing and microprocessor 550 could use this information to hold off a scheduled reclining event until the user finishes typing (since the user may not be able or want to type while reclined).

The above feature of using pressure sensors 560 to establish a pressure-signature for the user at different chair orientations may function with or without the use of motors 558a, 558b, 558c. If motors are not used, the movable components of a chair would move similar to how these components move in conventional adjustable chairs. Such "manual" movements are made by the user activating levers to release mechanical locks and relying on the user's weight to force movement of a component against the action of a return spring. For example, should a user lean back in a chair, pressure sensors 560 would sense this (through a measured increase in pressure or force) and pressure sensors 560 could record these pressure or force readings when the user is at the reclined position.

It should be noted that pressure sensor is a term that includes any of a variety of sensors that measure applied force or pressure. A preferred type of pressure sensor is a load cell, or strain gauge. A strain-gauge is a transducer that is used to create an electrical signal whose magnitude is directly proportional to the force being measured. Some load cells operate by measuring a change in resistance when a load is applied and then generating an electric signal that is proportional to the applied load. Other types, such as Piezoelectric load cells work on the same principle of deformation as the strain gauge load cells, but a voltage output is generated by the basic piezoelectric material itself and the voltage output is proportional to the deformation of load cell and therefore also to the applied load. Regardless of the type of pressure or load sensor that is used in the chair, the sensor must be sensitive enough to reliably measure relatively slight changes in applied load, as a user sits in chair 510.

Regardless if each or certain chair component movements are motor driven or user driven, the inclusion of pressure sensors and a supporting control circuit in a chair, as shown in FIG. 2 and as described above could be used to:

a) Create a digital signature for each user;
b) Keep track of the weight of the user over time;
c) Keep track of the user's posture overtime;
d) Determine the user's chair-position history; and
e) Determine if the user is accurately following a assigned chair-position schedule;

By creating a digital signature for each user, the control circuit would be able to understand if the current user sitting in the chair has a pressure-sensor profile stored in memory. If so, then the chair components (when motor driven) could be automatically positioned to that user's preferred and desired chair positioning (overall height, backrest recline lock or level of spring bias, seat cushion tilt, armrest height, etc.). Also, once the user is known, his or her personal chair-position schedule could be uploaded and followed.

In use, and referring again to FIGS. 1 and 2, a purpose of the present chair 510 is to encourage the user of the chair to sit in a manner that prevents or discourages poor posture and related back pain, joint and circulatory problems and improves the health and posture of the user.

According to the preferred embodiment, as described above, chair 510 includes several displaceable components that can be moved to change position (within a range of movement).

Chair 510 preferably includes three modes of operation, automatic, semi-automatic and manual modes.

Automatic Mode:

In automatic mode, the displaceable components of chair 510 are automatically moved at prescribed times following a schedule to best maximize the health, posture, and comfort of the user. By way of example of this operational mode, the user could be seated in chair 510 for 510 minutes typing on the computer. An internal clock within microprocessor 550 would indicate that a scheduled chair position is due. According to the disclosure, the user would be notified that a change is imminent by causing the component that will be changing position to gently undulate back and forth, or up and down with at a gradual and non-disturbing, non-vibration, rate, such as within 5 and 30 cycles per minute and at an amplitude of less than 5 inches of movement, depending on the component (this undulation is called a "whisper-breath"). Illumination from LEDs (not shown) and/or sounds generated by speaker 570 could also be used to function as an alert to the user, but the gentle undulation type alert is preferred. If the position schedule requires that the user recline in their chair for 5 minutes, then the backrest would gently undulate for one or two full oscillations prior to the movement occurring, preferably between 5 and 20 seconds prior. The user will feel this undulation and understand that the chair's backrest is about to recline to a prescribed angle 30-40 degrees from vertical, for example. During the undulating alert and thereafter (including during and after the backrest pivots back to recline), the user can cancel the scheduled event in one of several ways, including:

a) By rotating the chair back and forth about the post;
b) By rolling the chair on the floor mat;
c) By bouncing one or both legs up and down (lifted up by flexing his or her foot of the floor);
d) By tapping either armrest once or twice (depending how the system is set up);
e) By leaning back against the backrest and then leaning forward;
f) By tapping on the smart sit/stand desk (assuming the desk and chair are paired to each other through wireless connection);
g) By tapping onto a remote device that has been paired to chair 510, such as the user's smart phone, or another such device; and
h) By announcing a "Cancel" command verbally to the chair directly, or through the user's smart phone.

In this automatic mode, microprocessor 550 will follow a prescribed chair movement schedule that will try to get the user of the chair to cycle through chair body movements including reclining back, sitting upright with lower thighs, sitting upright with a raised thighs and standing upright, every 20 to 30 minutes, as described above. If the user cancels a particular chair-movement event, microprocessor 550 will revise the schedule for that particular user to try to get the user to move more while seated. The schedule will mesh with the sit/stand schedule is a smart desk is also being used.

According to another feature of the disclosure, chair 510 is adaptive and will learn the user's behavior and physical ability and will continuously adjust the positioning schedule accordingly. For example, chair 510 will keep track how close the user keeps to the preferred positioning schedule. If the user tends to sit more often than stand, then the schedule will adjust to provide more sit time at first and then slowly decrease the permitted sit duration so that the user can adjust to the new positioning and hopefully adapt too. Also, chair 510 can keep track of the user's schedule and seating habits, such as encouraging more standing earlier in the morning and providing more sit upright time later in the day. It should be noted, however, that although there is some room to adjust the positioning schedule, it is still important that the user moves to different positions, as described above regularly and if he or she cannot, then a manager may have to intervene and provide the user with additional help and support, as necessary.

If a stepper motor 558*a*, *b*, *c*, is being used instead of smoother servo-type or rotary type motors, the resulting movement of each displaceable component will be a bit jerky, since a stepper motor is more like a rotary solenoid divided up into degrees of a rotation. The jerky motion would be noticeable and subtle, but not annoying. Applicants' contemplate using this subtle jerky motion as a non-annoying alert that a movement event is about to occur.

Semi-Automatic Mode:

In semi-automatic mode, a user operates user input 562 (buttons on an accessible control panel, not shown) to instruct microprocessor 550 to activate select motors 558*a-c* to move a select chair component, as desired by the user until the desired new position of the particular chair component is reached. For example, the user may decide to raise their armrest 529 and can push a button located on the armrest itself, or push a button located on a control panel (not shown), which will cause motor 558*a*, *b*, *c*, that is associated with that armrest displacement mechanism to activate and displace the armrest to the desired point in movement. Semi-auto mode means that the user initiates the move of a particular component, but electric motors 558*a-c* perform the actual movement. A contemplated variation here is that pressure sensors located at various locations within chair 510, such as in lower seat cushion 524 and backrest cushion 522 will sense sudden increased pressure one, two or three times in a row, evenly spaced apart which is caused by the user pushing back, for example, against the backrest. This movement acts as instructions for the control circuit to electrically drive the backrest back to a prescribed angle, or until the user instructs the control circuit to stop. Alternatively, the user can tap onto their Stir sit/stand smart desk controller which is embedded in the surface of the desktop. This action (or similar tapping action sequence) will cause the control circuit of chair 510 to perform the action, receiving the instructions from the desk by wireless communication 554. Another variation of this would include an image of the desk chair 510 on either the display of the Stir sit/stand smart desk, their smart phone display, or on the user's laptop/PC computer display. The user can either tap the part (component) of the chair that they wish to displace or hold their finger on their touch screen, on the chair part they want to move. This action will translate into an instruction to move that part, sent to chair 510 and received by wireless communication 554. The user simple releases the touch screen to stop the movement. If the screen is not a touch screen, the user can use their mouse and cursor.

Manual Mode:

Manual mode means the user both initiates the move of a particular component of the chair and then makes the actual move of the component. In manual mode, the components are mechanically disengaged from the motor and motor drive mechanism. Manual mode is similar to the movement of conventional chairs. This mode is preferably used only when battery 552 depletes or another electrical failure occurs and the user requires movement before the battery is recharged, or the failure is corrected.

Monitors and Postural Rotation:

Applicants' acknowledge that if the user is using a computer with a display on their desktop, the viewing angle may be compromised by the movement of a part of chair 510, such as if the chair reclines. In this instance, the user could have difficulty viewing the display and work efficiency could decrease. Applicants' propose a display mount (not shown) that would be mounted on the user's desktop and would support the user's monitor. The display mount would include two motors (or drives) that would allow the display to move up or down (closer or farther away from the table top), and tilt up and down. The display mount, according to this disclosure, would be powered remotely and would include onboard controlling circuitry and wireless communication (or would be hard-wire communication connected to the smart desk). The display mount would be paired with the smart desk, is one is being used, and chair 510. In use, as chair 510 moves, the chair's control circuit would send instructions by way of wireless communication 554 to move the supported display up or down or tilt up or down in an effort to reposition the display to align with the newly repositioned user's head.

In a further enhancement the monitor mount can periodically adjust (ideally automatically or semi-automatically) when a user is sitting upright in their chair between straight ahead of user which is often comfortable for the neck but can cause eye strain, and a second lower tilted position which is more ideal for the eyes but can cause some neck strain. As noted it has been suggested by ergonomists that one's "next position in his or her best position" suggesting that there is not one single good position for a monitor.

In a further enhancement the monitor mount would adjust to result in the user looking slightly to the left and slightly to the right (ideally automatically or semi-automatically) to support periodic healthy position changes of the neck and spine. Additional actuators would be added to enable this motion.

Conference Room Application:

The above-described disclosures directed to Chair 510 can be applied to many different types of chairs, but a primary intended chair type is the office chair used at desks within an office setting. However, these chairs can also be used in a conference room setting wherein several chairs populate the perimeter of a large conference table. In this application, all the desks and chairs used in the entire office could be connected wirelessly to the company's server wherein all individual chair positioning and use information can be stored. Chair 510 can further include a simple reader (not shown), such as optical, magnetic, Bluetooth® or RFID, etc. This reader may be used to sense or otherwise read information, preferably automatically, from an employee's security card (or other ID type card), or phone when the user sits at any chair within the company, including the chairs positioned around the conference table. In use, once the employee sits in any of the chairs, the selected chair will automatically identify the user and the onboard control system will activate the various motors 558*a-c* of the chair to position all moveable chair components to align with the seated user's stored preferences. This approach may also be applied in other instances when many people use the same chair at different times such as in "desk sharing," which is also referred to as "hot-desking" in the furniture industry Using Chair Movement for Alerts:

According to yet another feature of the present disclosure, different motors 558*a-c* are selectively activated to move select chair components in preset movement patterns which could be single movement, slow or quick, or oscillatory and can repeat at spaced intervals. This allows chair 510, working with wireless connection to the company's server, the user's smart phone, the user's computer, the user's smart desk, or other similar devices to communicate upcoming or current events to the seated user in a non-disturbing manner. The user could assign (during setup) different types of chair component movements with specific types of event alerts. For example, microprocessor 550 could be instructed to activate the chair's seat cushion motor 558*a-c* in an up and down undulating movement with an amplitude of 2 inches peak-to-peak and a period of 4 seconds in response to an upcoming meeting, as listed in an appointment program operating on the user's smart phone, such as MS Outlook® provided by the Microsoft company of Redmond, Wash. 98052. The first movement could indicate a 15 minute reminder prior to the particular meeting. At 5 minutes, microprocessor 550 would interrogate sensors 560 and would learn, in this example, that the user is still seated, and would then confirm that the meeting appointment remains active. Microprocessor 550 would then move the same component up and down, but now at a quicker frequency, such as 2 second cycles and with an amplitude of just 1 inch and would increase the duration for 5 seconds. This action provides the user of an alert of higher urgency. The user may cancel the alert sequence for the particular appointment either on his or her smart phone or by moving in a preset manner in the chair within a preset time limit after the start of the alert, such as by rotating the chair about post 514 clockwise and counterclockwise twice within 510 seconds after the beginning of the alert sequence. Sensors 560 would detect this rotation and microprocessor 550 would cancel further alerts for this scheduled appointment.

Other chair components can be moved in a similar manner to remind the user of other events.

An important feature of the present disclosure is that chair 510 is "smart" and connected to the user's smart devices. The chair according to the disclosure effectively becomes a giant computer mouse in that the user can move different components of chair 510 to perform specific computer related tasks, such as cancelling a meeting alert. The chair can also receive information from other smart devices and the Internet and the company's server to understand the seated user, his or her profile, preferences, and schedule etc. and respond automatically if necessary, to better the user's health and workplace efficiency.

Figure 4:
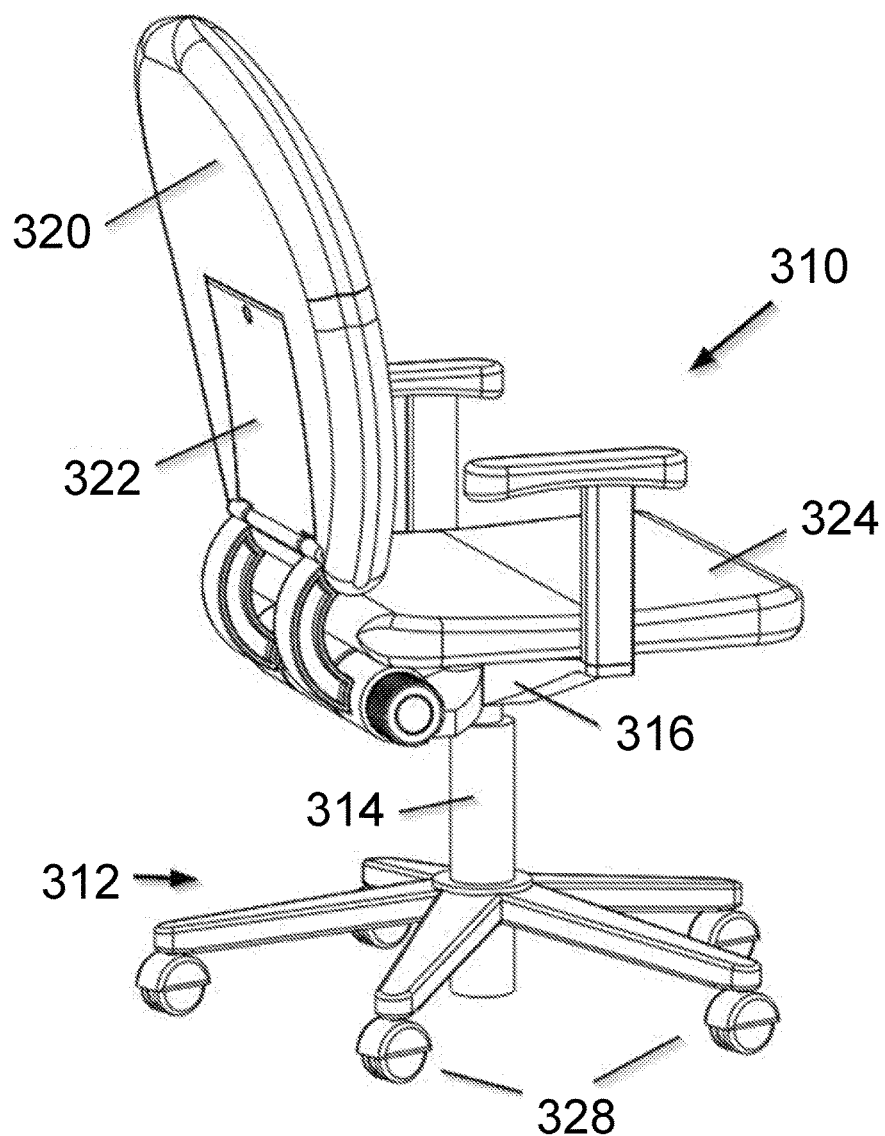
FIG. 4 is a rear perspective view of an exemplary ergonomic seating structure, showing various components, in accordance with the present disclosure.
Figure 5:
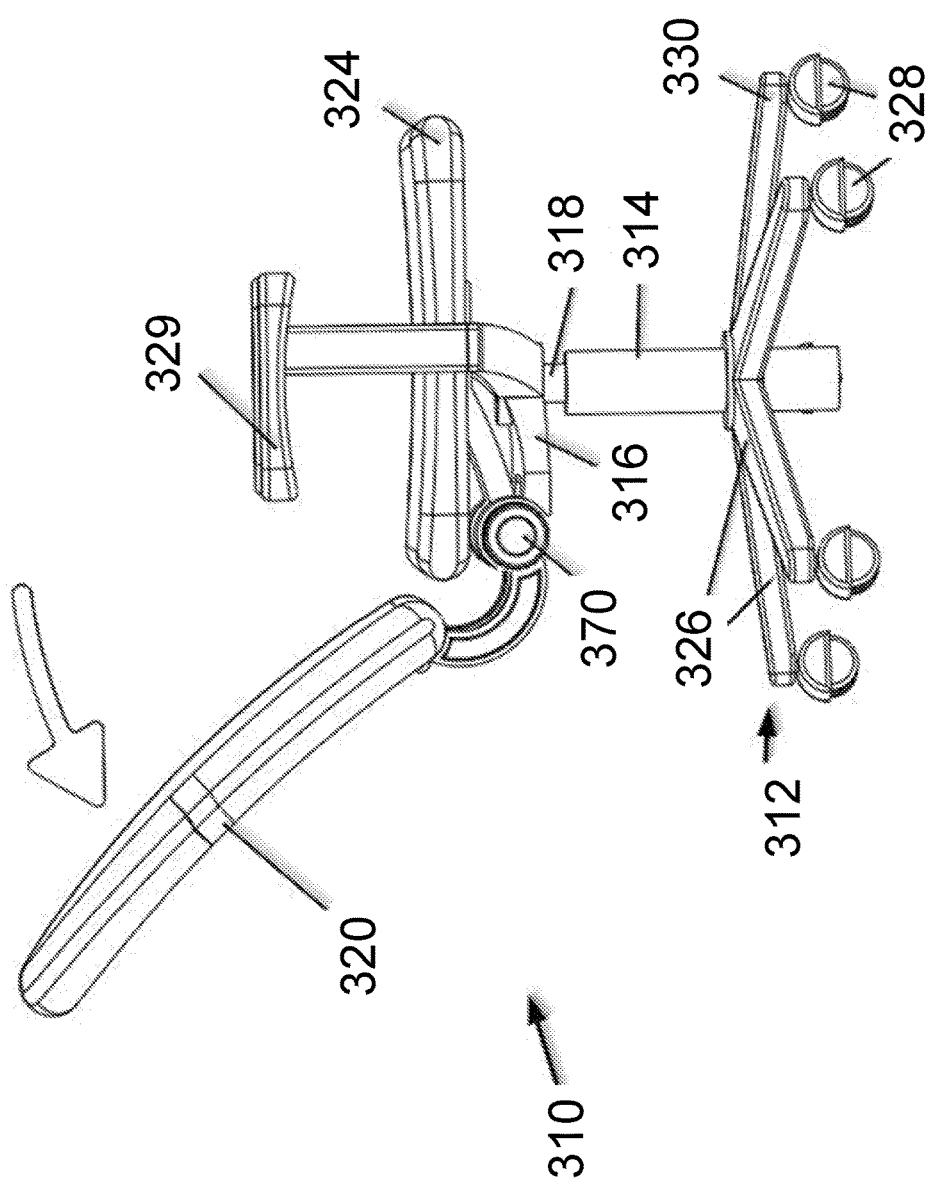
FIG. 5 is a side elevation view of the seating structure of FIG. 4, showing the backrest reclined, in accordance with another embodiment of the disclosure.

Referring to FIGS. 4 and 5, and according to another embodiment of the present disclosure, a seating structure 310 is provided having a dolly structure 312, from which a post 314 upwardly extends. A yoke assembly 316 includes a vertically disposed piston 318 which is slidably secured to post 314, as understood by those of skill in the art. A backrest 320 is pivotally secured to a portion of yoke assembly 316. A seat portion 324 is pivotally secured to a portion of yoke assembly 316. As is well known by those skilled in the art, dolly structure 312 includes 5 radially disposed legs 326, each having a caster wheel 328 pivotally attached to a remote end 330. A left and right side armrest 329 are mounted to yoke assembly 316 by a telescoping connection and are selectively vertically displaceable.

Figure 6:
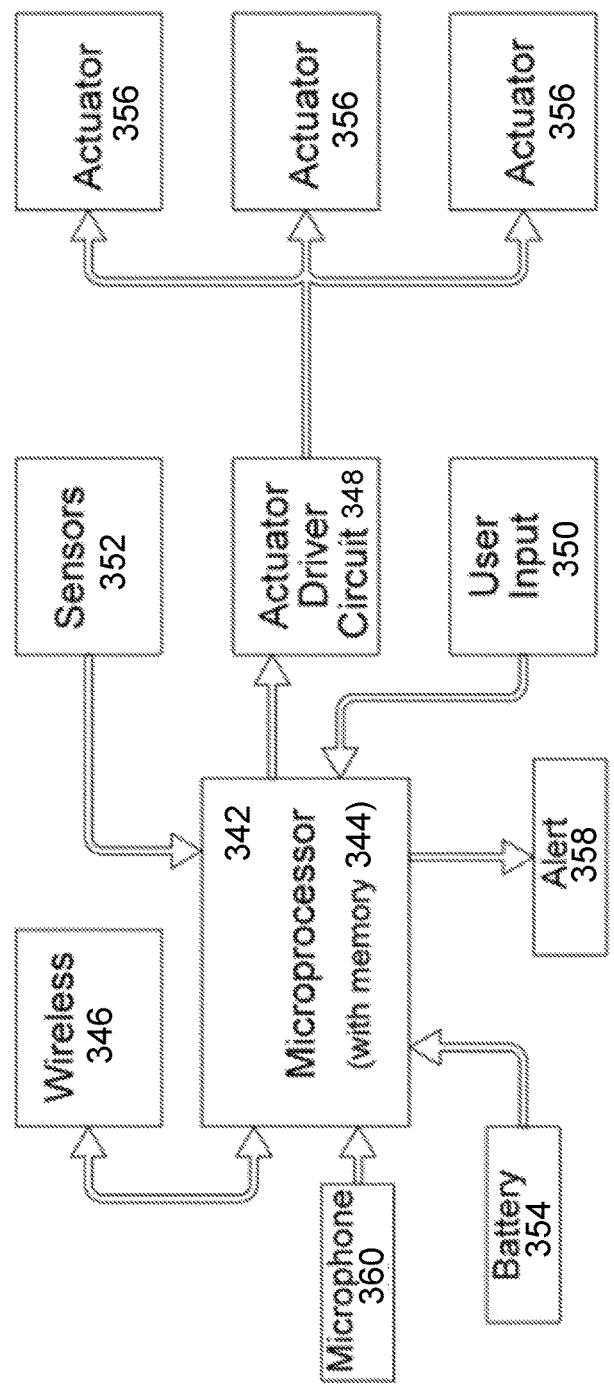
FIG. 6 is a schematic showing various electrical components, in accordance with the disclosure.

As shown in FIG. 6, and according to the disclosure, seating structure 310 further includes a microprocessor 342, memory 344, wireless communication 346 and an actuator driver circuit 348, collectively called a control circuit 340. Seating structure 310 further includes user input controls 350 (buttons, knobs, etc.), positioning sensors 352, a battery 354 and actuators 356. All these components are mounted throughout the seating structure and are electrically connected to microprocessor 342.

As is understood by those skilled in the art, backrest 320 is pivotally secured to yoke assembly 316 and may pivot back (or recline) between a generally straight upright position (no recline—about 90° with respect to seat portion) and a predetermined full recline position, defining an angle of about 130° with respect to the seat portion 324. As with conventional seating structures of the type that include a reclining backrest, backrest 320 is biased to the upright no-recline position by a spring-bias, which may be provided by compression, tension, torsion, or axial mechanical springs, a pneumatic piston arrangement, or another mechanism, as understood by those skilled in the art.

In conventional adjustable seating structures, the magnitude of this recline-spring-bias may be controlled by a lever (not shown). Also, hard stop points may be selected using knob 370 that prevent backrest 320 from reclining past a fixed preset angle. This allows the user to decide the maximum degree of recline the backrest will move, when he or she leans back in the chair. As mentioned above, often the user keeps the preset recline angle to a no recline angle of about 90°, straight upright. Unfortunately, when the user does this, applicants' research indicate they often forget the need to alleviate the strain on the discs of their vertebrae and to return their lumbar curve back to its desired rest position and slouch. In other words, most users don't think about reclining when they are working and miss out on the health benefits of cycling regularly between reclining, sitting upright and standing every 20 minutes or so throughout the day.

Positioning sensors 352 are positioned at different locations on seating structure 310 and are used to detect user presence (is there a user sitting in the chair), if the user is seated upright, the force the user is exerting against backrest 320, and the angular position of backrest with respect to seat portion 324. The type of sensor may vary depending on what it is required to sense, but the sensors are well known and may be conventional. Strain-gauge type sensors may be mounted, for example, within seat portion 324 to detect the user's weight (and therefore the user's seated presence) and also the force the user is exerting against backrest 320. Optical-coupler sensors or hall-type sensors may be used to determine the angle of backrest 320. Any type of sensor may be used here, as understood by those skilled in the art, without departing from the disclosure.

Manual Mode (Remind):

According to a first manual mode of operation of this embodiment of the disclosure, at prescribed times, following a schedule stored in memory 344, microprocessor 342 will first interrogate the sensors to determine certain values, including:

a) If there is a person seated on seat portion 324;
b) The force being exerted against backrest 320;
c) The current angle of backrest 320; and
d) The preset maximum reclining angle (set by the user).

At prescribed times, based on the schedule, if there is a person seated and the current angle of backrest is less than the prescribed and suggested recline angle, microprocessor 342 will send an alert (from alert generator 358) to the seated user, such as a vibration, a tactile impulse, a movement of a chair component, illuminating lights, or generating sounds or a voice, to indicate that a reclined position is suggested to maintain good posture and health. This reminder to the user may also be in the form of a generated alert that will appear on his computer screen, or even on the user's smart phone, as a push notification text or alert. The user may cancel the request by voice (which would be "heard" by a connected microphone 360), pushing a button on input control 350, moving one of the chair components (including rolling the chair on the floor mat) a prescribed number of times, such as two or three times, tapping on a chair component, such as armrest 329 (picked up by a sensor) or using their smart device (such as their cell phone, computer, or other) which is connectable by wireless communication 346 (Bluetooth®, Wi-Fi_____33, etc.). According to this mode, and the disclosure, the user is only reminded to change position (recline). The recline tilt lock (or hard-stops) will not be automatically released. If the user does not cancel the alert or reminder, control system 40 will continue to remind the user at preset intervals. If the user does heed the reminder and manually releases the recline tilt lock, he or she will push against backrest 320 (against the action of the spring-bias) until the desired recline angle has been reached. Sensors 352 will detect the angle and will either confirm that the recline angle is following the recommended angle (acceptable) with another confirmation alert, or with another alert that indicates that the user must further recline. The user may still select the maximum angle of recline.

After a prescribed period of time at the reclined position, control system will alert the user that the reclining period has ended and that backrest 320 may be (or should be) returned to the full upright position, or to a different position, such as the previous recline position set by the user. The user may again cancel the alert and remain in the reclined position, as desired.

Automatic Mode (Remind and Disengage):

According to the disclosure, in a semi-automatic mode, control system 340 performs the same reminding process as in the above-described manual mode, but now the user is being reminded that unless he or she cancels the event, any tilt-stop or hard stops will automatically release and backrest 320 will be released and the user will be allowed to lean back to a reclined position. In this mode, backrest 320 does not automatically recline, but only releases any stops that have been preset and subsequently allows the user to recline to a greater degree, the degree to which may be selected by the user in an interface such as a smart-phone connected via Bluetooth. If the user remains seated upright during this time, sensors will detect this and in response, microprocessor 342 will generate alerts, as before, to the user that must be cancelled. The behavior patterns of the user may be aggregated and transmitted to a usage dashboard or otherwise aggregated for later review. Once backrest 320 reaches the prescribed angle of recline (according to the event schedule), applicants contemplate locking backrest 320 in the reclined position. The seated user may activate a control or voice command to release the fully reclined lock at any time.

After a prescribed period of time in the reclined position, control system will alert the user that the reclining period has ended and that backrest 320 will either be unlocked (if that feature is set) or the alert is merely a reminder to the user that the recline time has ended and that the user may raise (with the action of the spring-bias) to an upright position. If the user remains reclined, alerts will continue, but the user may again cancel the alert and remain in the reclined position. Control circuit 340 causes recline lock to automatically match the lock settings before the recline. If it was set to lock, then the locked setting will be reset. Same with unlocked.

In each mode, the user determines the maximum angle of recline.

Training Mode:

Since seating structure 310 can be paired with a separate smart device, applicants contemplate using the smart device to help educate the user how to use the chair—a kind of real-time interactive instruction manual.

In use, when a user touches a control on the chair, for example, a height adjustment lever, this action would be sensed by sensors and the microprocessor would work with an app running on the user's smart-phone to explain how the height adjustment works, with video, graphics and text instructions. When the user does adjust the height of the chair, according to one embodiment, a graphic located on the screen of the smart-phone simultaneously show the seat move in the same direction.

This training tool works with different alerts. In such instance, if the user feels three vibrations in the cushion of their chair, in the training mode, the microprocessor on the chair can communicate to a smart device to push instructions of what the three vibrations means. This would continue for a period of time and automatically shut off. Alternatively, the training tool can be used to detect how the user responds to a particular alert sequence, if applicable, and can use this information to determine if further training is required.

Similarly, the user can tap on the screen of their smart-phone over a particular graphic component of the chair and the information would be transmitted to the microprocessor on the chair which would cause that selected component to move or vibrate, to indicate where a particular component is located.

Figure 9:
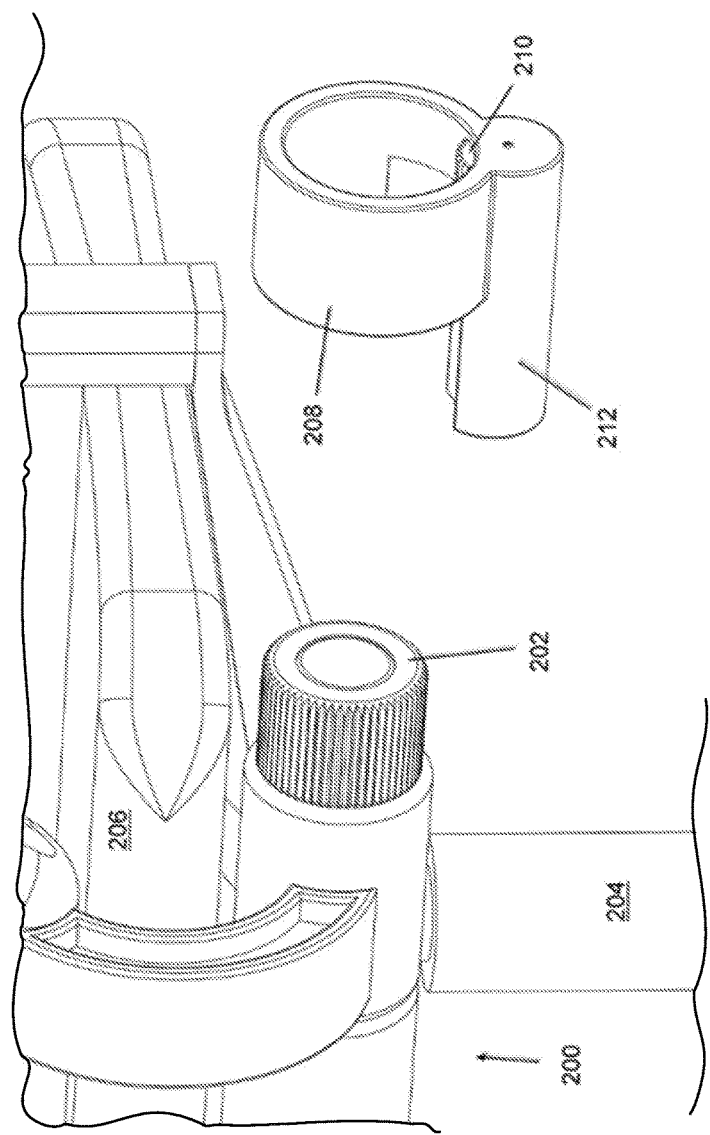
FIG. 9 is a partial perspective view of the seating structure of FIG. 7, showing details of an add-on tilt-control unit prior to being secured to the seating structure, in accordance with the present disclosure.

Feature Module:

This disclosure provides a chair that includes an easily accessible and replaceable component (a "module"). The module can be positioned anywhere on the seating structure, but is preferably secured (such as snapping into place or being inserted like a cartridge into a snug-fit recess or cavity) to the backrest of the chair, as shown in FIG. 9. The module includes any of several features including massaging motion to massage the user's back, vibration (or mechanical impact) which may function as an alert to the user, heat and transforming lumbar support, as detailed below.

Figure 7:
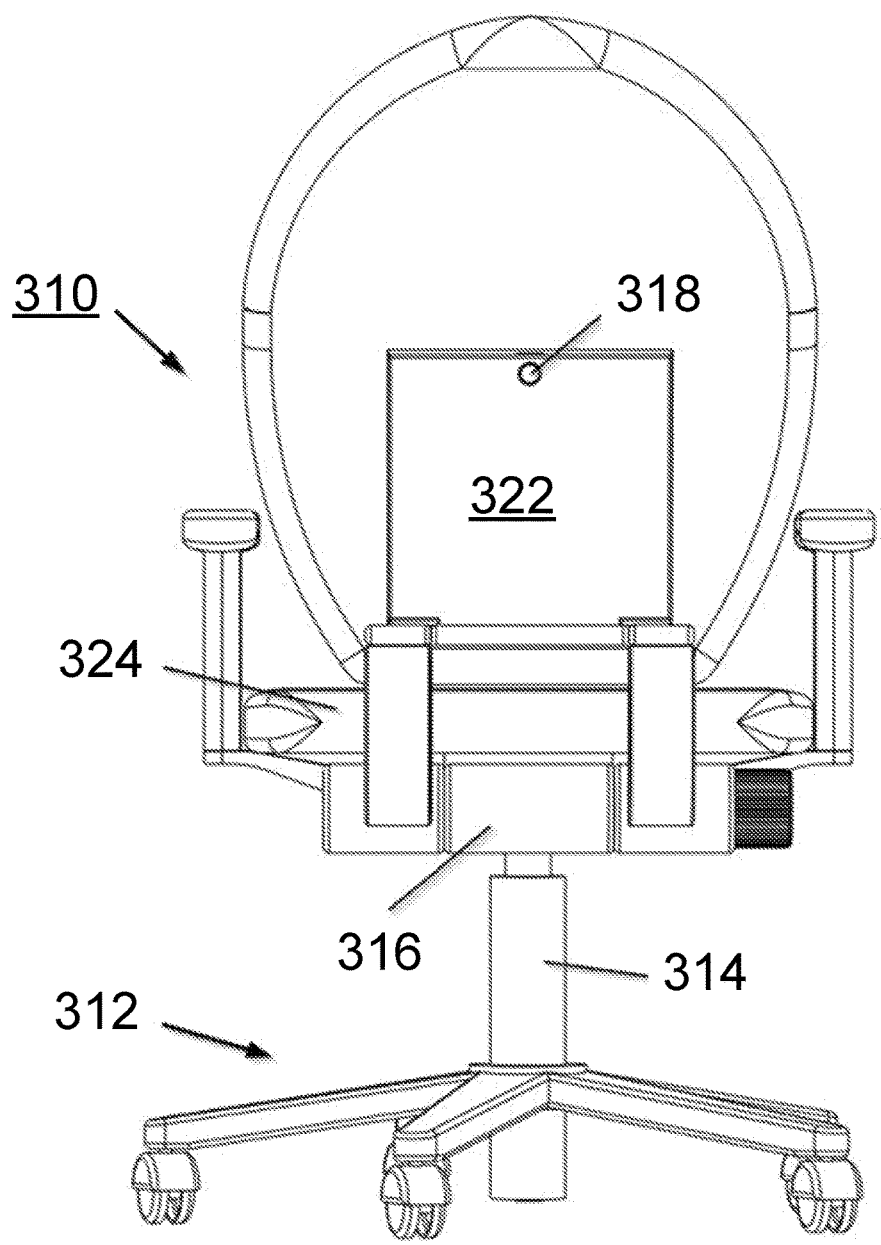
FIG. 7 is a rear plan view of the seating structure of FIG. 4, in accordance with the present disclosure.
Figure 8:
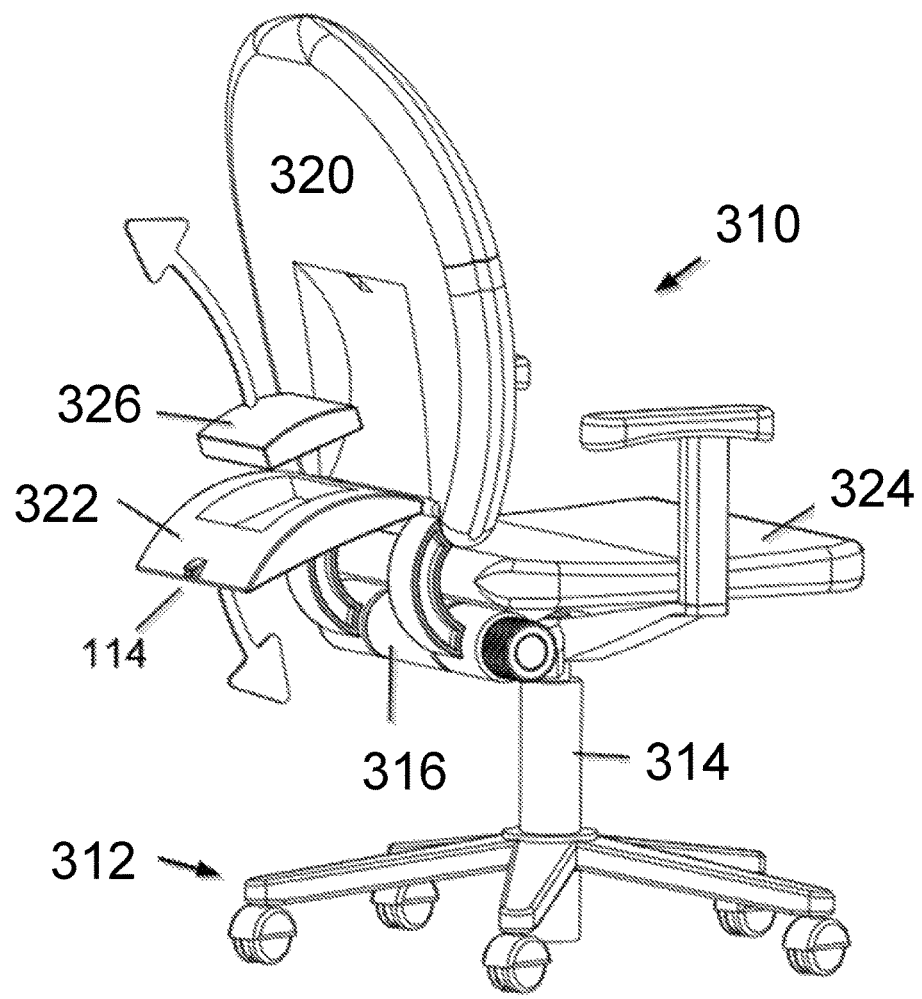
FIG. 8 is a rear perspective view of the seating structure of FIG. 7, showing the module access door open and the module being removed therefrom, in accordance with the present disclosure.

Referring now to FIGS. 4, 7 and 8, a chair 310 is shown including a dolly assembly 312, a post 314 attached thereto and supporting a yoke 316. A seat portion 324 is attached to yoke 316. A backrest 320 is pivotally attached to yoke 316 and includes a module cover 322 which is pivotally attached to backrest 320, pivotal between a fully closed position, shown in FIG. 4 and an open position, shown in FIG. 9. Module cover 322 is securable to backrest 320 when in the closed position by a latch 318, for example. When module cover 322 is in the open position, a module 326 can be accessed, removed and replaced by the same module or other ones. Module 326 preferably includes its own power supply (such as batteries, not shown), and is controlled by wireless communication (e.g., Wi-Fi_____33, Bluetooth®) to a remote smart device (e.g., smart-phone, remote control unit, a laptop computer, tablet, or smart desk).

One type of application for a module is messaging which includes an electromechanical actuator that can be activated to create single tactile impulses, preferably to the back of the user, a sequence of tactile impulses, or a pattern of pulses generated at prescribed frequencies, amplitudes, and durations. These tactile patterns are used to communication information to the seated user in a subtle and non-disturbing manner. The electromechanical actuator can be a solenoid, a motor rotating an offset weight, linear motion actuators, rotational vibrators, pendulum vibrators and oscillators, or similar. An onboard microprocessor controls the electromechanical actuator to generate a predetermined tactile message to the user's back. Since the microprocessor is paired with the user's smart device, such as his or her phone, and laptop, the tactile messages could provide a reminder that a meeting is starting in 10 minutes, for example. Another proposed use would be to have the tactile messaging convey the passage of time, by transmitting a single impulse, for example, every half hour of time, or at lunch time, etc.

This messaging module could include connections to automatically connect with electrical components already installed in a chair, or could include all the required components, all self-contained, including, a battery, a controller circuit (microprocessor, memory, etc.), an impulse generator and a wireless communication circuit, such as Bluetooth®.

To install the module, in the example shown in the figures, the user simply inserts the module into the cavity of the module door. The door is then closed.

The module feature can be remotely controlled by the user's smart device so that exposed controls on the module itself are not necessary.

Another proposed module includes a section that can expanded or contract against the user's back so that it can selectively provide lumbar support. Once example would be to control the inflation or deflation of a sealed fluid bladder.

Another proposed module includes a heating element and a strong massaging oscillation generator (not shown). This module would provide local heat and massaging on demand by the user. Again, the user merely has to select the option and duration on his or her smart device.

Figure 10:
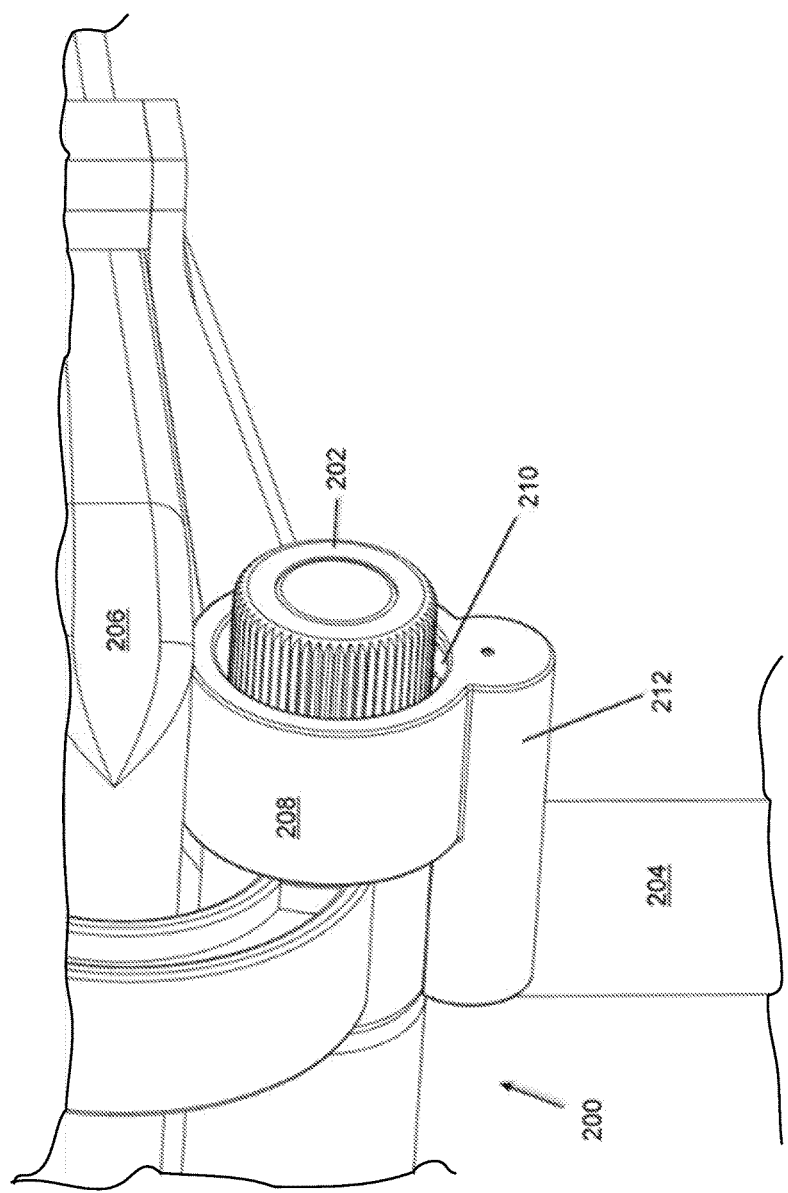
FIG. 10 is a partial perspective view of the seating structure of FIG. 9, showing details of the add-on tilt-control unit secured to the seating structure, in accordance with the present disclosure.
Figure 11:
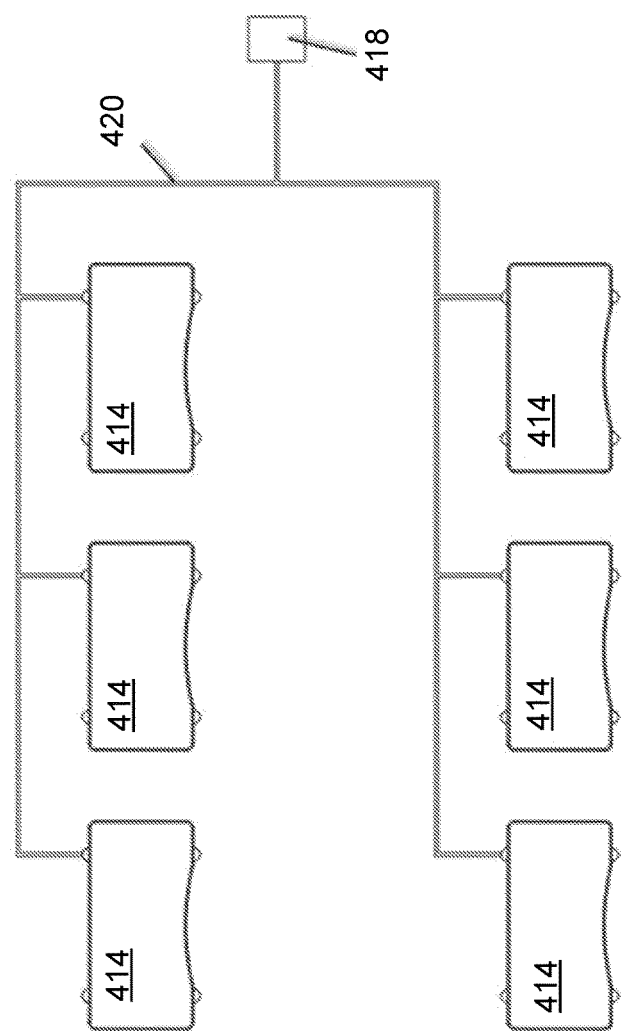
FIG. 11 is a top plan view of an exemplary matrix of installed sit-stand desks showing connection to a controller, according to the present disclosure.

Add-on Tilt Control Unit:

Referring to FIGS. 9 and 10, a seating structure 200 is shown having a seat portion 206 mounted to a post 204. Preferably a knob 202 (having external teeth) is provided to selectively release the recline lock, allowing the user to recline the backrest of the seating structure. Other mechanisms for actuated rotation may be used here in place of the knob, as understood by those skilled in the art. According to this disclosure, an add-on tilt-control unit 208 is provided which includes a housing 212 that houses an actuator (not shown), a drive gear 210, a battery (not shown), and controlling circuitry (not shown, but the same as shown in FIG. 6 and described above. Add-on tilt control unit 208 would be custom made to fit each seating structure 200, as required. In this example, add-on tilt control unit 208 is designed and shaped to snuggly secure to seating structure 200 around knob 202, as shown in the figures. As shown in FIG. 11, gear 210 is sized and positioned to engage the teeth of knob 202. Gear 210 is mechanically attached to the actuator of the add-on tilt control unit 208 so that when actuator is activated, gear 210 will rotate and, in turn, rotate knob 202, in a direction that causes the factory-installed tilt-lock mechanism that is located within seating structure 200.

Once installed to seating structure 200, as shown in FIGS. 9 and 10, the operation of add-on tilt control unit 208 is the same as above-described embodiments. Depending on the mode, control circuitry, powered by onboard battery, announces to the user that the position-change schedule is recommending a position change. If the recommended change is a recline, the user will be so notified by an appropriate alert, as described above in earlier embodiments. The user may decline by moving the chair side to side or pivoting the seat 206 about post 204 or use other input methods described in this specification. Sensors within add-on tilt control unit 208 will detect this and reschedule the position-changing event. If the user accepts the change (by doing nothing), the add-on tilt control unit 208 will activate the internal actuator and gear 210 so rotate knob 202 and release the reclining tilt-lock. The user will then push back against the backrest to a reclined position. After a prescribed period of time, the user will again be alerted and he can again move back to a different position. Of course, other tilt-lock and tilt-release mechanisms may be used in connection with this embodiment of the disclosure, as understood by those skilled in the art.

Health Management Light:

According to this disclosure, an LED is mounted to the seating structure or nearby desk and will illuminate when the user (employee) is actively following the prescribed position-change schedule during reclining. This communicates that that the user is reclining for health management reasons and addresses cultural inhibitions to reclining in certain office environments that applicants have identified in their research. Control circuit 40 can also instruct a nearby smart-device to offer a similar indication. A separate device could be positioned on the desk and instructed to illuminate during this time period of reclining or when standing to provide encouragement help overcome cultural barriers to these changes in work styles.

Sit-Stand Desk with Remote Height Management:

By way of overview and introduction, the present disclosure concerns improvements of managing sit-stand desks and in turn, positively influencing healthy behavior of workers. The embodiments discussed below are not intended to be exhaustive or limit the disclosure to the precise forms disclosed in the following detailed description. Rather, the embodiments are chosen and described so that others skilled in the art may utilize their teachings.

Figure 12:
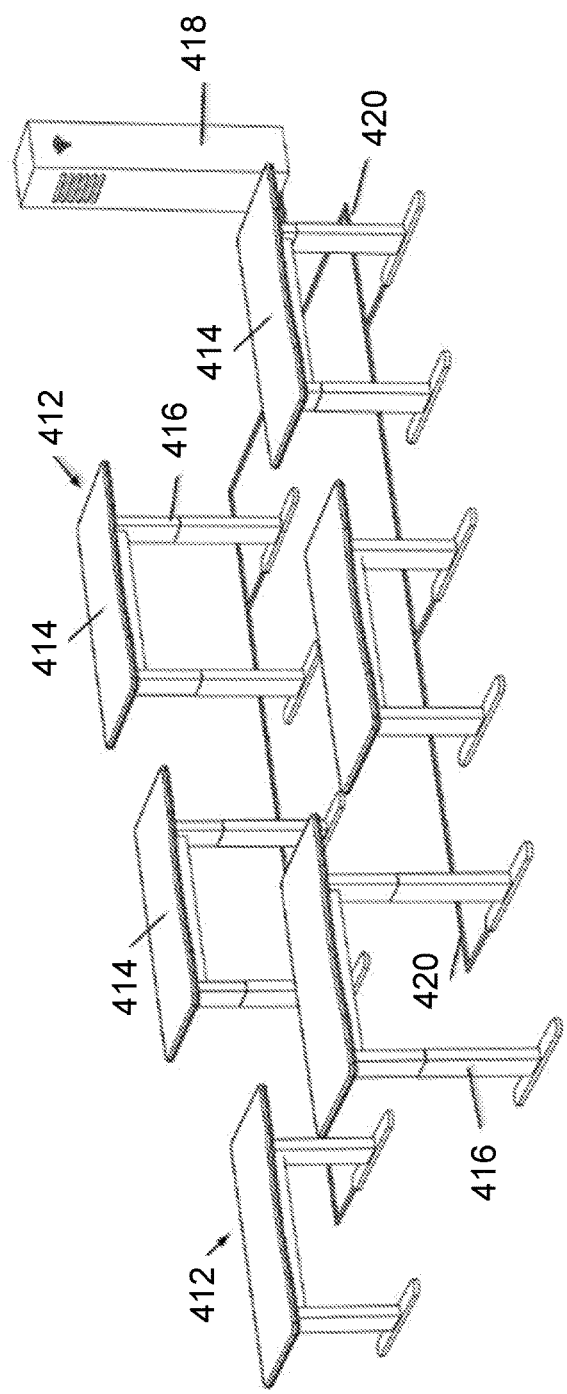
FIG. 12 is a perspective view of the exemplary sit-stand desks of FIG. 11, showing each desk having a worktop positioned at a different height, according to the present disclosure.
Figure 13:
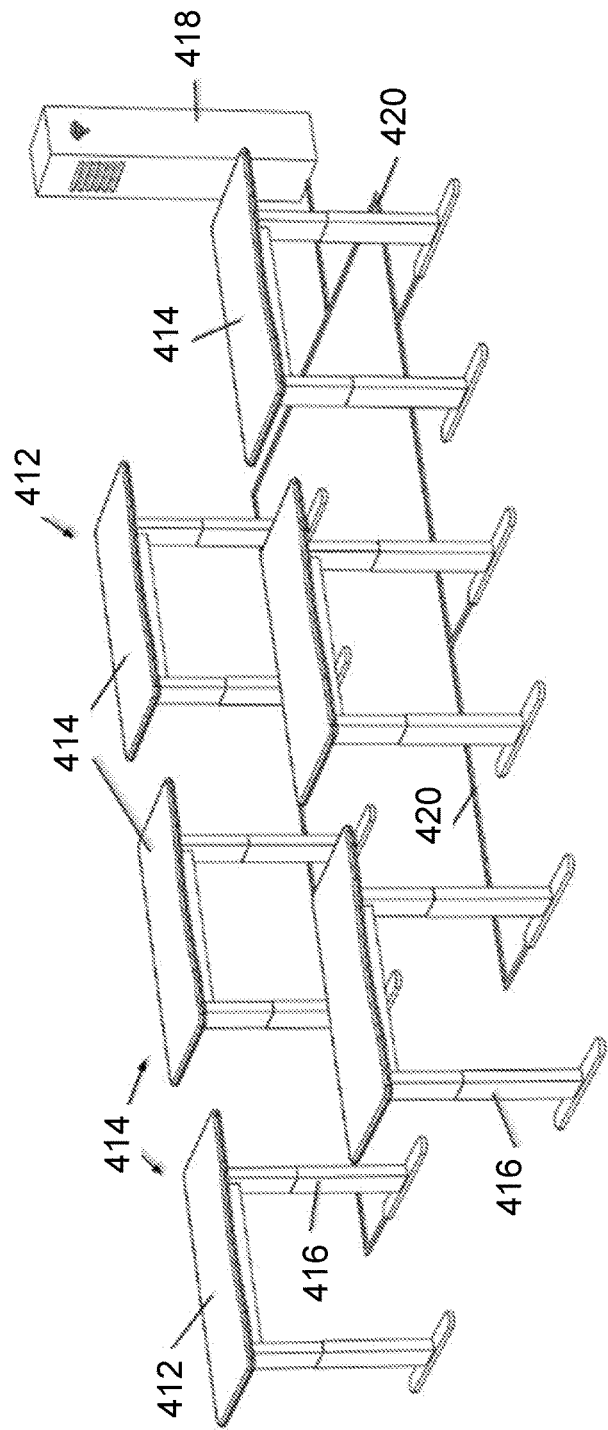
FIG. 13 is a perspective view of the exemplary sit-stand desks of FIG. 11, showing the worktop of each desk in the matrix positioned at a common height, according to the present disclosure.

Referring to FIGS. 11-13, an exemplary installation of six sit-stand desks are shown. Each desk 412 includes a worktop 414, and motorized legs 416. According to a first embodiment of the disclosure, motorized legs 416 are controlled by a local control unit (not shown) secured to worktop 414. A user of each desk 412 can use the control unit to power motorized legs 416 to move worktop 414 up and down to a desired height. According to this disclosure, each control unit of each desk 412 is connected to a local master controller 418. The connection can be either hardwired, such as using a CAT-5 communication cable 420 shown in the figures, or wirelessly, using Bluetooth®, Wi-Fi, or another suitable system.

According to one embodiment of the disclosure, local master controller 418 includes a timing circuit (not shown), an Internet connection (not shown) and a control panel (not shown). Local master controller 418 is in electrical communication with each of desks 412 and may change the height of each worktop 414 of each desk 412 either individually, in preselected groups, or all simultaneously. The height change to any, or all worktops 414 (that are connected to local master controller 418) can be controlled manually, by an operator using the control panel (not shown) located at local master controller 418. Alternatively, the height change commands to select desks or all desks may be generated automatically, following a timing schedule, such as:

| Which desk(s)? | Move to what height? | When should this occur? | On which days? |
|---|---|---|---|
| ALL | 44 inches | 8:00 PM | M-F |

In the above example, the desktops of ALL the desks controlled by local master controller 418 are programmed to reposition to a new set height of 44 inches above the floor at 8:00 PM, each night, Monday thru Friday, unless instructed otherwise. According to another embodiment of the disclosure, sensors (not shown) located at each desk 412 detect the presence of a user at a desk. Such sensors may be proximity, pressure (used in connection with a pressure mat), infrared (e.g., thermal), optical, capacitive, or similar, as is well known by those skilled in the art. If it is determined (through sensing) that a particular desk is being used at the time of a scheduled height change (e.g., at 8:00 pm, Monday), an "in use" signal will be sent to, or read by local master controller 418 at the time of the planned event. In such instance, all other, unoccupied desks will proceed to move to the new scheduled height (e.g., 44 inches), but the occupied desk in this example will remain unchanged and in full control by the immediate user. Once it is determined (by scheduled interrogation of local master controller 418) that the user no longer occupies the particular lone desk, local master controller 418 will instruct that desk to raise its worktop 414 to the scheduled height (e.g., 44 inches) to match the height of the other desks in the group.

According to the present disclosure, if a user returns to a desk after leaving and his or her desk has already been raised to a new scheduled height by local master controller 418, the user may simple return the desktop height to any desired height using the controls at the desk. Local master controller 418 will periodically interrogate that desk (and any other desk which is forced off the master height schedule by the user) to determine through electronic sensing if the user has left. At such time, local master controller 418 will again reset the height of the now unoccupied desk to match the height of the others, or to match the prescribed height of that desk, according to the preset schedule.

In one embodiment, the height of each desk is programmed to move to a set height that is common to all desks (i.e., all desks will move to the same height value) in the controlled group, as represented illustratively in FIG. 13. According to another embodiment of the disclosure, each desktop is moved to the "stand" height set by and specific to each respective user (their highest worktop setting). In this embodiment, each desk will raise to a specific max height which may or may not be equal to the other desks in the group.

An important benefit to having all sit-stand desks pre-positioned at the "stand" position in the morning when the users arrive is that doing so encourages the users to actively use the sit-stand desk to benefit their respective health. Applicants have learned that there is a psychological benefit generated when a user arrives and sees their desk in the stand position. The user is more likely to start their work standing and is more likely to continue using the sit-stand schedule of their own desk throughout the day. By setting their sit-stand desk to its "stand" position at the start of the day, the user is reminded of the desk's main purpose—to encourage a healthy lifestyle and behavior.

Another benefit to having the worktops 414 all rise to a high setting at night, is that doing so provides better access for the cleaning crew to clean under and around each desk.

The present system could also lower each desk to a low height if desk includes sensors that allow the desk to stop in respond to contact with an obstruction or sense obstructions and not descend. This is not always a preferred approach so some desks only include functions that only automatically raise the desk.

It is not uncommon, in some installations to have hundreds of sit-stand desks arranged and online, in a single large group (such as at a call-center). In this environment, it is not uncommon for several or many desks to be unoccupied for extended periods of time, as different factors change the schedules and populations of workers throughout the group. Having the worktop 414 of some or many unused desks in the room remain in a "stand" or high-setting position for extended periods of time may be considered unsightly, or may otherwise interfere with daily operations as people move about in the room and between the desks. To address this concerns and according to another feature of this disclosure, user-data history for each desk and sensors located at each desk could be used to determine the occupancy of any desk in the group. If it is determined that any desk has not been occupied for a predetermined period of time, for example, at least 2 days in a row, local master controller 418 would flag those specific desks to remain at a low, "seated" height until the desks are used once again. By doing this, the present system would not force the worktops 414 of unused desks to remain raised at the "stand" or max positions for extended periods of time during work hours.

System for Remotely Powering Seat Structures:

Referring now to FIGS. 14-18, a system for remotely powering a seat structure is shown, including a chair 450 having a base 452, a central post 454, a seat portion 456, a backrest 458 and armrests 460. Chair 450 is shown positioned on a floor mat 462 in FIG. 14. As described in greater detail below, floor mat 462 includes at least one embedded primary induction coil 464 which is electrically connected to a charging control circuit (not shown) and is powered by line voltage (plugged into a nearby outlet—not shown).

Chair 450 may be conventional in structure in that base 452 includes a number of radially disposed, equally spaced legs 466 (usually five) radiating from central post 454, which is vertically disposed. Attached to the remote end of each leg 466 is a caster wheel 470, collectively allowing the chair to selectively roll along floor mat 462. Seat portion 456, backrest 458, and armrests 460 are either directly or indirectly mechanically supported by central post 454 and in turn support the seated user. In conventional use of chair 450, as is well known, a user sits on seat portion 456, leans back, as desired against backrest 458 and supports his or her arms on armrests 460, again as desired. The user may push their feet against floor mat 462 to cause the entire chair 450 to roll on caster wheels 470 along the floor mat in any planar direction, as necessary.

According to the present disclosure, and referring to FIGS. 15-18, a secondary induction coil and drive assembly 480 is secured to the underside of base 452. Assembly 480 includes an upper housing 482 and a vertically displaceable lower housing 484. Lower housing 484 supports a secondary induction coil 486, a drive wheel assembly 488, and location sensors 490. As mentioned above, lower housing 484 may be selectively displaced vertically with respect to upper housing 482, as described below. However, lower housing 484 is preferably snugly slidably engaged in a telescoping manner with upper housing 482, allowing relative vertical movement, but minimal relative lateral or transverse displacement. Lower housing 484 mechanically supports drive assembly 480, which, although not shown in great detail, includes a drive motor connected to a drive wheel 492 and drive circuitry. Drive motor (not shown) and drive wheel 492 are mounted to a pivotal frame (not shown) which can rotate about a central axis. A steering drive (not shown) is mounted within lower housing 484 and connected to the pivotal frame (not shown). Steering drive is connected to drive circuitry.

An actuator (not shown) is mounted to either lower housing 484 or upper housing 482 and is used to displace lower housing 484 with respect to upper housing 482 in a controlled manner. This actuator is preferably a servo type drive motor, but may also be a linear drive motor or solenoid, or a drive mechanism used in combination with an over-center spring arrangement. Regardless of the type of actuator used, the function of the actuator is to move lower assembly 484 between a lower position (shown in FIG. 18), wherein drive wheel 492 frictionally engages floor mat 462 and secondary induction coil 486 becomes immediately adjacent to the upper surface of floor mat 462, and an upper position (shown in FIG. 17), wherein drive wheel 492 and secondary induction coil 486 are remote from floor mat 462, as described in greater detail below.

Figure 14:
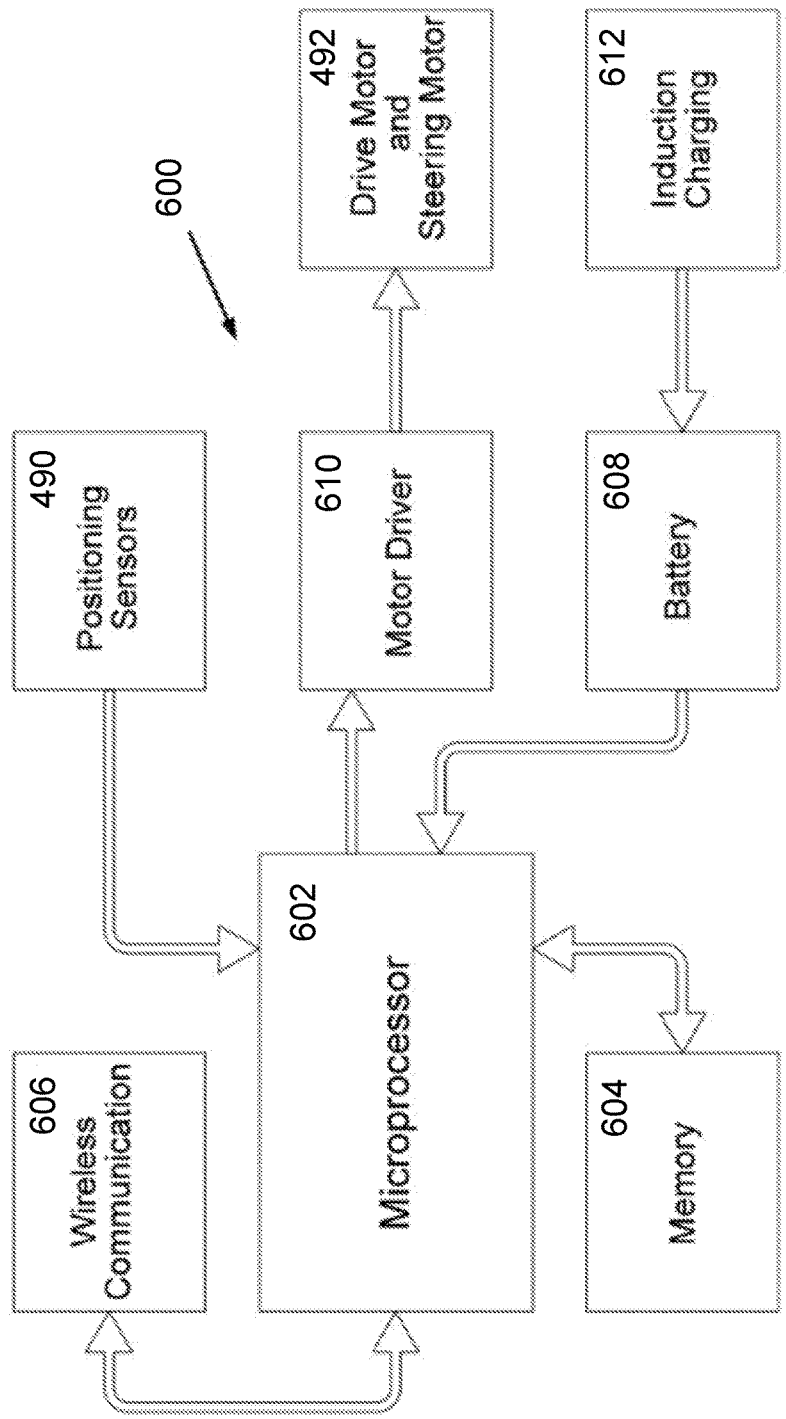
FIG. 14 is an operational schematic showing the different components used to operate various electrical functions of a chargeable mobile chair, according to the present disclosure.
Figure 15:
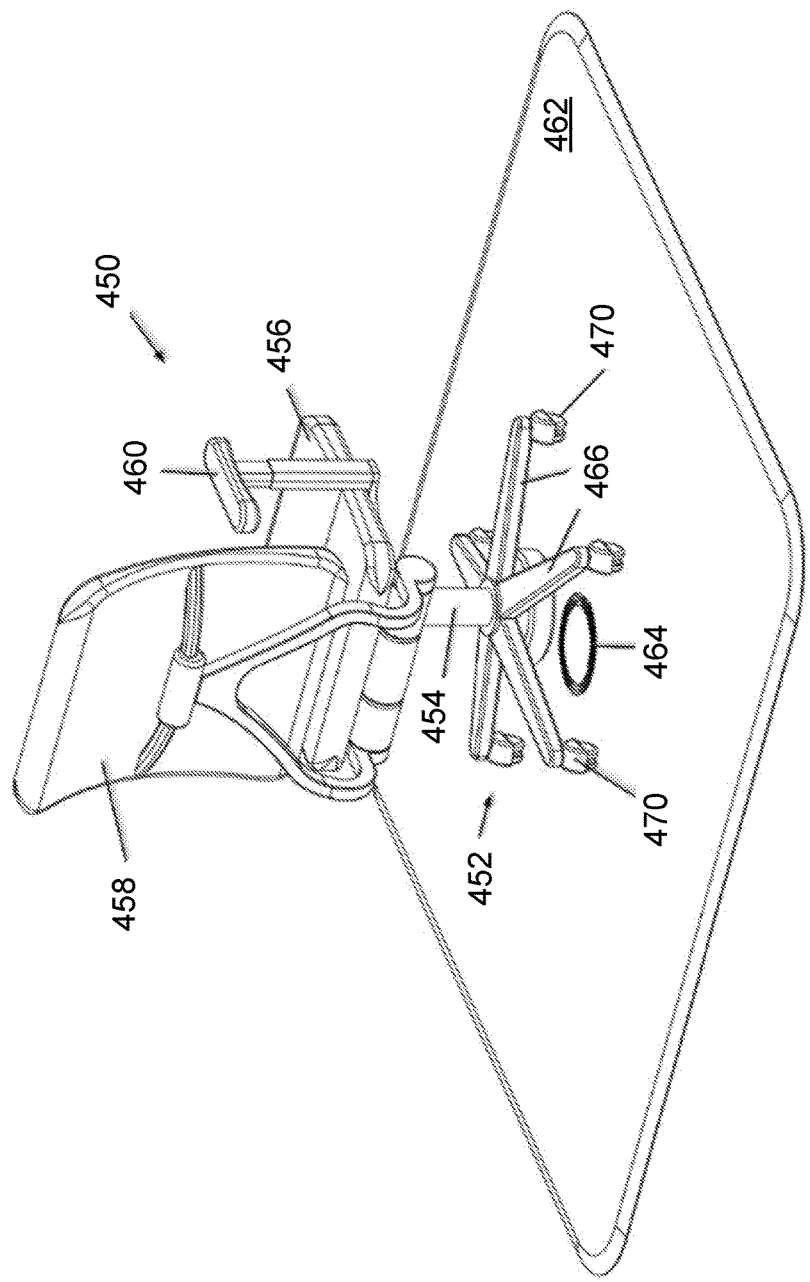
FIG. 15 is a perspective view of a mobile chair located on a chair-mat, showing details of an induction charging system, according to the present disclosure.
Figure 16:
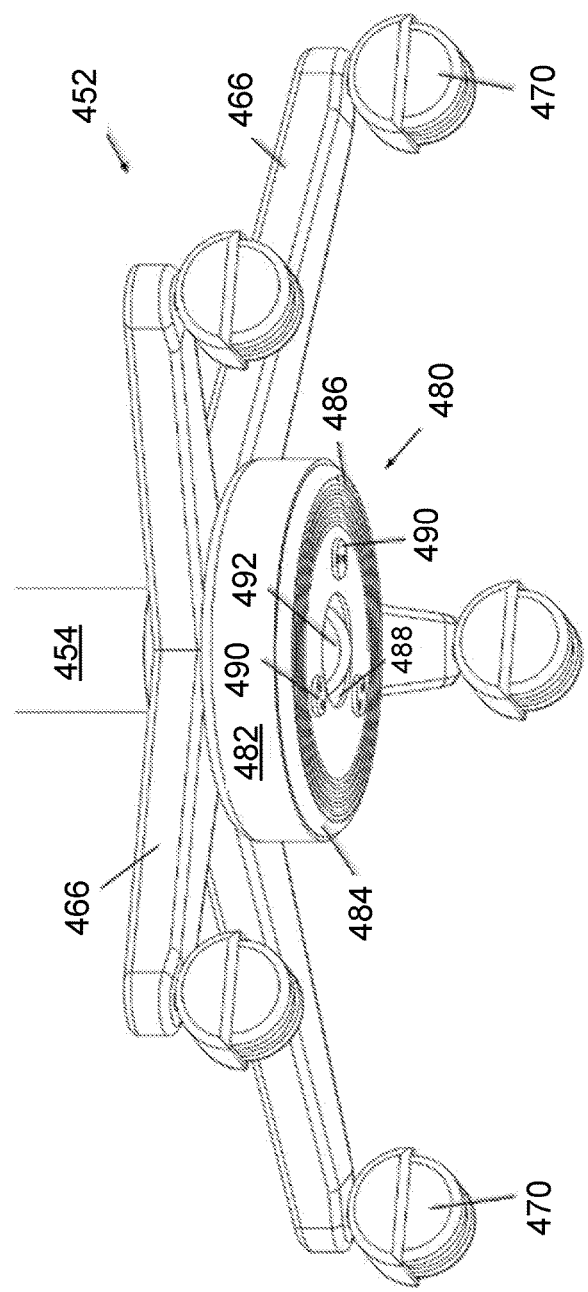
FIG. 16 is a perspective view of a portion of the mobile chair of FIG. 15, showing a chair base supporting the induction charging system of FIG. 15 with the system shown in a retracted and stowed position, according to the present disclosure.
Figure 17:
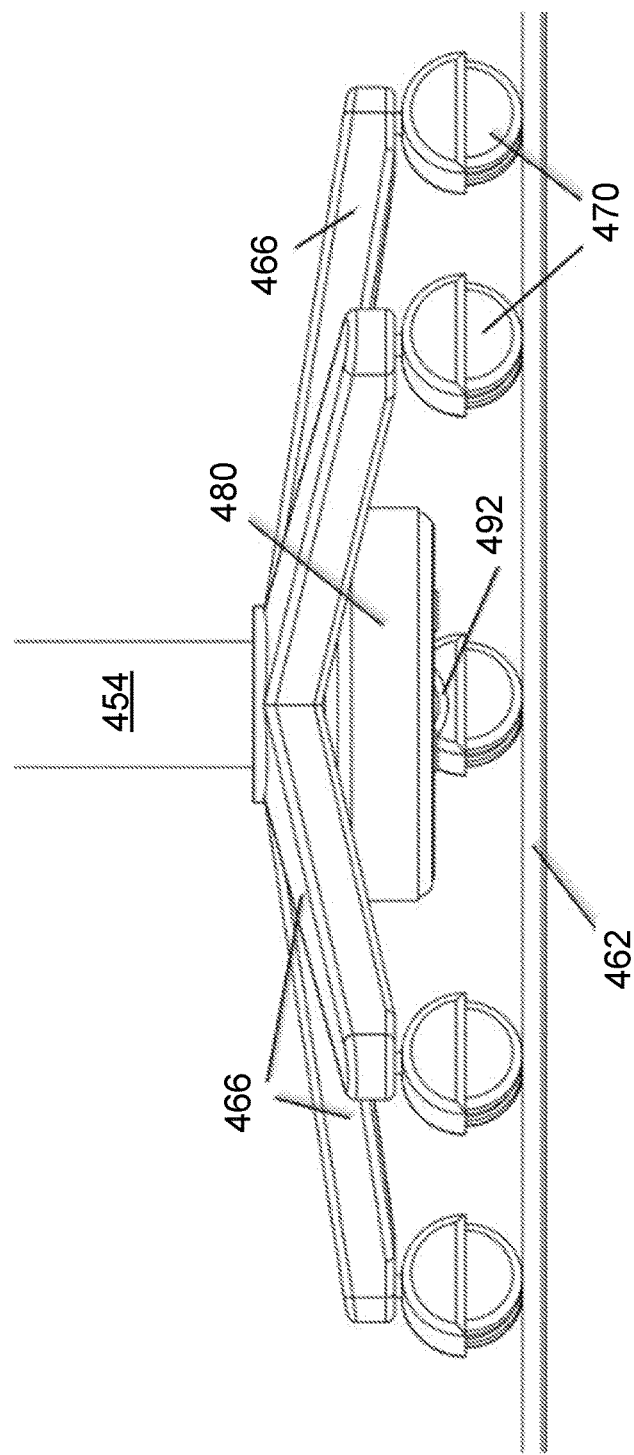
FIG. 17 is an elevation side view of the induction charging system of FIG. 16 with the system shown in a retracted and stowed position, according to the present disclosure.

As shown in the operational schematic of FIG. 14, a control circuit 600 includes a microprocessor 602, memory 604, wireless communication 606 and a battery 608. Control circuit 600 is located on chair 450 in an appropriate (preferably accessible, but hidden) location. Microprocessor 602 is connected a motor driver circuit 610, which in turn is connected to the above-described drive motor that powers drive wheel 492 and steering drive (not shown). Battery 608 is an appropriate rechargeable battery and is used to power all electronic components used on chair 450, including microprocessor 602, memory 604, wireless communication 606 and allow drive actuators described herein. Battery 608 is also electrically connected to an induction charging control circuit 612. Positioning sensors 490 are connected to microprocessor 602 to provide positioning information of chair 450 on mat 462, as described in greater detail below.

Figure 18:
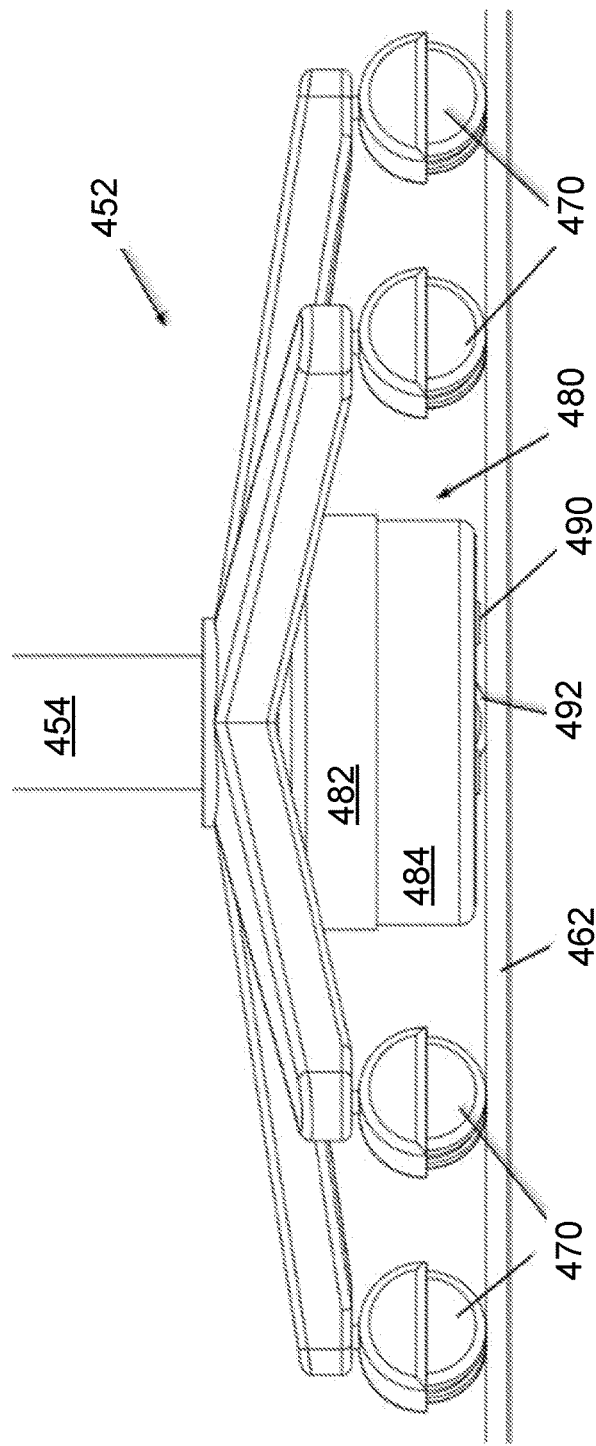
FIG. 18 is an elevation side view of the induction charging system of FIGS. 16 and 17 with the system shown in an extended and deployed charging position, according to the present disclosure.
Figure 19:
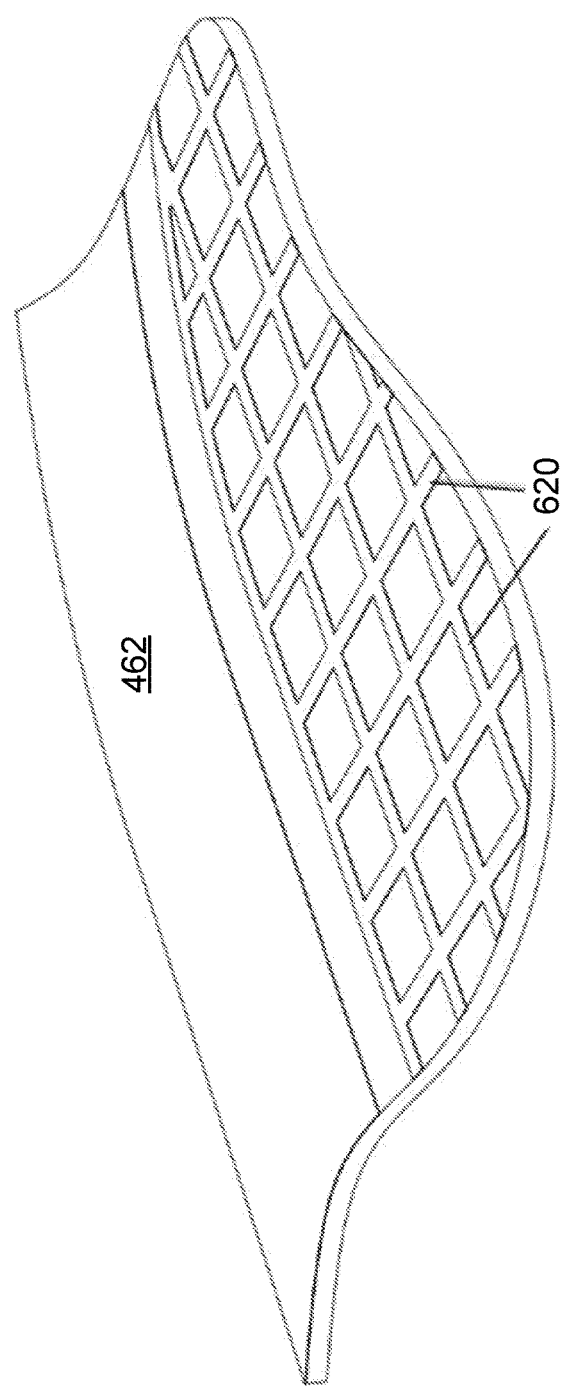
FIG. 19 is a partial close up sectional view of a floor mat, showing details of registration lines that are used to help locate the position of the chair, according to the present disclosure.

Referring to figure FIG. 18, a section of floor mat 462 is shown including a plurality of lines 620. The lines are preferably printed onto mat 62 and thereafter coated with a protective coating so that lines 620 will not wear out during use. Lines 620 are sensed by sensors 490 and used to help control circuit determine the exact location of chair 450 on mat 462. Lines 620 can vary in width, and/or vary in spacing therebetween. This controlled variation in either line width or line spacing is accurately measure by sensors 490, similar to how a conventional laser mouse reads a mouse pad to determine relative location and movement. As explained below, when lower assembly 484 is positioned in the lower position (as shown in FIG. 18), sensors 490 become immediately adjacent to mat 462 and lines 620. As chair 450 is moved across mat 462, sensors 490 move across lines 620 and measure their unique characteristics, such as line width and line spacing and send this information to microprocessor 602 during operation, as described below. In this embodiment, sensors 490 are laser emitter and receiver type, but sensors 490 may be other types, including infrared or magnetic (Hall sensors), in which case, lines 620 would be made from a magnetic material so that they would be detectable by the Hall type sensors.

In use of chair 450, battery 608 is initially fully charged and any electrically-powered accessories of chair 450 can be used throughout the day by a user. Microprocessor 602 carefully measures the charge of battery 608, as it discharges. When the charge remaining on battery 608 reaches a certain level, microprocessor 602 will activate an audible (sound), visual (LED), or tactile (vibration) alert to the user, indicating that the battery is low and that charging is required for that night. It is preferred that control circuit will charge battery 608 frequently enough to always allow the user with full use of all electrical accessories during each day. When battery 608 requires charging and the user is so alerted by microprocessor 602, the user may (if he or she remembers) manually position chair 450 to align over primary charging coil 464 located in mat 462. Since charging coil 464 is embedded within mat 462, a visual mark (not shown in the drawings) is preferably provided on the mat surface so that the user may easily see coil 464 during chair alignment. If the user does manually move chair 450 over primary coil 464, the user will activate a button or switch on chair 450 (not shown) which will cause control circuit to deploy lower assembly 484. This will cause secondary coil 486 to become immediately adjacent to primary coil 484. In such instance, a charging circuit (not shown) located within mat 462 will detect that the two coils are aligned and will activate primary coil 464 (allowing current to flow therethrough). As is well known, the current flowing in primary coil 464 will induce a charge and current to flow in the adjacent second coil 486, which will in turn be used to charge battery 608 located on chair 450.

Should the user forget to move chair 450 into the coil-aligned charging position, control circuit 600 will do it automatically. Once battery charge passes a predetermined threshold, and the time of day reaches a predetermined time (e.g., 9 PM), and sensors detect that a user is not seated in seat rest 456 (by measuring load thereon) microprocessor 602 will activate motor driver 610 to drive actuator (not shown) to move lower assembly 484 from its raised and stowed position, shown in FIG. 17, to its lowered position, shown in FIG. 18. In the lowered position, drive wheel 492 will frictionally contact the upper surface of floor mat 462.

Once drive wheel is fully lowered, control circuit will power the motor attached to drive wheel 492 causing chair 450 to roll about mat 462. During this initial drive period, sensors 490 located on the lower surface of lower assembly 484 will accurately read lines 620 located within mat 462. This detection and reading of lines 620 will allow microprocessor 602 to determine the chair's location on mat 462. Microprocessor 602 will then control drive motor and the steering motor to effectively move chair 450 so that secondary induction coil 486 aligns with primary induction coil 464, allowing charging to commence.

Once charging completes (either battery 608 is fully charged or after a prescribed time period), an appropriate motor will be activated to return lower assembly from its deployed position back to its retracted and stowed position.

Should chair 450 be moved when lower assembly 484 is in its deployed position, sensors 490 will immediately detect this and microprocessor 602 will instantly raise lower assembly 484 so that drive wheel 492 no longer contacts floor mat 462. After a period of time, as long as chair 450 is not moving and no person is detected seated thereon, lower assembly 484 will again be deployed, drive motor will again activate so that sensors 490 can determine the chair location on mat 462 and control circuit 600 can again drive motors to move it back to the charging location so that charging may continue.

While this disclosure has been described as having an exemplary design, the present disclosure may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

While the invention may be susceptible to various modifications and alternative forms, specific embodiments have been shown by way of example in the drawings and have been described in detail herein. However, it should be understood that the invention is not intended to be limited to the particular forms disclosed.

Thus, the invention is to cover all modifications, equivalents, and alternatives falling within the spirit and scope of the invention as defined by the following appended claims.

To apprise the public of the scope of this invention, the following claims are made:

What is claimed is:

1. A system for guiding a user while changing a juxtaposition of one furniture component with respect to another furniture component on a furniture assembly, the system comprising:
    a sensor for sensing a position of a first component with respect to a second component;
    an indicator for indicating when the position of the first component with respect to the second component should be changed by the user from a current position to another position;
    a control mechanism activatable by the user for changing the position of the first component with respect to the second component;
    a processor linked to the sensor and the indicator and programmed to use sensor signals to track the position of the first component with respect to the second component and to provide periodic first reminders to change the position of the first component with respect to the second component from the current position to another position, the processor continuing to track the first component position as the user moves the first component toward the another position and, when a repositioning stops short of the another position, controlling the indicator to generate a first alert that the repositioning should continue until the another position is achieved.

2. The system of claim 1 wherein the processor is further programmed to, upon the first component reaching the another position with respect to the second component, presents a second alert indicating that the another position has been achieved.

3. The system of claim 2 wherein the indicator presents at least one of an audible first reminder and a visual first reminder.

4. The system of claim 2 wherein the indicator presents a haptic first reminder.

5. The system of claim 4 wherein the haptic first reminder includes at least some movement of the first component wherein the first component is in contact with the user.

6. The system of claim 4 wherein each of the alerts is also a haptic reminder.

7. The system of claim 4 wherein the haptic first reminder is presented by moving the first component with respect to the second component.

8. The system of claim 1 further including a motor for driving the first component with respect to the second component wherein the control mechanism controls the motor.

9. The assembly of claim 8 wherein the control mechanism includes a sub-component of the first component.

10. The system of claim 1 wherein the first component is a backrest of a chair and the second component is a seat.

11. The system of claim 10 wherein the current position and the another position are first and second angles of recline between the backrest and the seat.

12. The system of claim 11 wherein the indicator is a first indicator and the system includes a second indicator, the first and second indicators spatially associated with the first and third components, respectively.

13. The system of claim 1 wherein the furniture assembly further includes a second sensor, a third furniture component and a fourth furniture component, the second sensor for sensing a position of the third component with respect to the fourth component, the processor also linked to the second sensor and further programmed to use second sensor signals to track the position of the third component with respect to the fourth component and to provide periodic second reminders to change the position of the third component with respect to the fourth component from a current position to another position, the processor continuing to track the third component position as a user moves the third component toward the another position and, when the repositioning of the third component stops short of the another position, controlling the indicator to generate a second alert that the repositioning of the third component should continue until the another position with respect to the fourth component is achieved.

14. The system of claim 13 wherein the first indicator is a haptic indicator that moves the first component to provide the reminder to change the position of the first component and the second indicator is a haptic indicator that changes the position of the third component to provide the reminder.

15. The system of claim 1 wherein the control mechanism controls a lock between the first and second components and wherein, after the lock is released, the user applies a manual force to the first component to move the first component toward the another position.

16. The system of claim 1 wherein the furniture assembly is a first furniture assembly and wherein the system further includes a second furniture assembly that is paired with the first furniture assembly, the indicator on the second furniture assembly.

17. A system for guiding a user while changing a juxtaposition of one furniture component with respect to another furniture component on a furniture assembly, the system comprising:
    a sensor for sensing a position of a first component with respect to a second component;
    an indicator for indicating when the position of the first component with respect to the second component should be changed by the user from a current position to another position;
    a control mechanism activatable by the user for changing the position of the first component with respect to the second component;
    a processor linked to the sensor and the indicator and programmed to use sensor signals to track the position of the first component with respect to the second component and to provide periodic first reminders to change the position of the first component with respect to the second component from the current position to another position, the processor continuing to track the first component position as the user moves the first component toward the another position and, when a repositioning stops short of the another position, controlling the indicator to generate a first alert that the repositioning should continue until the another position is achieved, the processor providing the first reminder by moving the first component with respect to the first component to generate a haptic first reminder.

18. The system of claim 17 wherein the processor is further programmed to, upon the first component reaching the another position with respect to the second component, presents a second alert indicating that the another position has been achieved.

19. The system of claim 18 wherein each of the alerts is also a haptic reminder.

20. The system of claim 18 further including a motor for driving the first component with respect to the second component wherein the control mechanism controls the motor.

21. A system for guiding a user while changing a juxtaposition of a backrest with respect to a seat on a chair assembly, the system comprising:
 a sensor for sensing a position of the backrest with respect to the seat; an indicator for indicating when the position of the backrest with respect to the seat should be changed by the user from a current position to another position;
 a control mechanism activatable by the user for changing the position of the backrest with respect to a second component;
 a processor linked to the sensor and the indicator and programmed to use sensor signals to track the position of the backrest with respect to the seat and to provide periodic first reminders to change the position of the backrest with respect to the seat from the current position to another position, the processor continuing to track the backrest position as the user moves the backrest toward the another position and, when a repositioning stops short of the another position, controlling the indicator to generate a first alert that the repositioning should continue until the another position is achieved, the processor providing the first reminder by moving the backrest with respect to the seat to generate a haptic first reminder.

* * * * *